(12) United States Patent
Discenzo et al.

(10) Patent No.: US 7,442,291 B1
(45) Date of Patent: Oct. 28, 2008

(54) FILTER INTEGRATION FOR A LUBRICATION ANALYSIS SYSTEM

(75) Inventors: Frederick M. Discenzo, Brecksville, OH (US); Chung-Chiun Liu, Cleveland Heights, OH (US); Laurie A. Dudik, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 498 days.

(21) Appl. No.: 10/409,895

(22) Filed: Apr. 9, 2003

Related U.S. Application Data

(60) Provisional application No. 60/371,104, filed on Apr. 9, 2002.

(51) Int. Cl.
*B01D 35/14* (2006.01)
(52) U.S. Cl. ............................ 210/85; 73/866.5; 96/417; 210/87; 210/90; 210/443
(58) Field of Classification Search ............... 210/85, 210/87, 90, 96.1, 143, 149, 435, 440, 443; 96/417–422; 73/866.5
See application file for complete search history.

(56) References Cited

U.S. PATENT DOCUMENTS

| | | | |
|---|---|---|---|
| 4,438,203 A | 3/1984 | Wohltjen et al. | |
| 4,626,344 A * | 12/1986 | Fick et al. | 210/90 |
| 4,949,070 A | 8/1990 | Wetzel | |
| 5,192,425 A * | 3/1993 | Cyphers et al. | 210/90 |
| 5,855,772 A * | 1/1999 | Miller et al. | 210/86 |
| 5,964,318 A | 10/1999 | Boyle et al. | |
| 6,023,961 A | 2/2000 | Discenzo et al. | |
| 6,447,573 B1 | 9/2002 | Rake | |
| 6,471,853 B1 * | 10/2002 | Moscaritolo | 210/85 |
| 6,537,444 B2 * | 3/2003 | Wilberscheid et al. | 210/85 |
| 2003/0075043 A1 | 4/2003 | Rake | |
| 2003/0221911 A1 | 12/2003 | Eriksen et al. | |

* cited by examiner

*Primary Examiner*—Joseph W Drodge
(74) *Attorney, Agent, or Firm*—Amin Turocy & Calvin LLP; R. Scott Speroff

(57) ABSTRACT

A system and method relating to in situ monitoring, analysis, and control of a lubricating material within a lubrication filter assembly is provided. A filter-sensor integration comprises a lubrication filter assembly and at least one lubrication sensing assembly, wherein the lubrication sensing assembly comprising at least one sensor array, and the sensor array comprises of at least one sensor. The lubrication filter assembly comprises a housing which defines a chamber, wherein lubricating material enters the chamber through a filter material. The lubrication sensing assembly is embedded into the chamber of the lubrication filter assembly, and the lubrication sensing device is positioned relative to the filter material so that the at least one sensor of the sensor array senses in situ different parameters of the lubricating fluid, analyzes measured parameters to determine health of the system, and generates a control signal to protect machinery and processes.

31 Claims, 17 Drawing Sheets

Fig. 13

| | $f_0$ | $f_1$ | $f_2$ | ... | $f_n$ |
|---|---|---|---|---|---|
| $TEMP_1$ | $A_3/V_3$ | $A_1/V_1$ | $A_{75}/V_{75}$ | ... | $A_K/V_K$ |
| $TEMP_2$ | $A_{34}/V_{34}$ | $A_{50}/V_{50}$ | $A_{56}/V_{56}$ | ... | $A_F/V_F$ |
| ... | $A_{56}/V_{56}$ | $A_{44}/V_{44}$ | $A_{94}/V_{94}$ | ... | $A_H/V_H$ |
| ... | $A_{78}/V_{78}$ | $A_{23}/V_{23}$ | $A_{29}/V_{29}$ | ... | $A_B/V_B$ |
| ... | $A_{37}/V_{37}$ | $A_{76}/V_{76}$ | $A_{19}/V_{19}$ | ... | $A_D/V_D$ |
| $TEMP_N$ | $A_{67}/V_{67}$ | $A_{88}/V_{88}$ | $A_{47}/V_{47}$ | ... | $A_Y/V_Y$ |

Fig. 14

| | $P_0$ | $P_1$ | $P_2$ | ... | $P_n$ |
|---|---|---|---|---|---|
| $TEMP_1$ | BAD V | BAD V | BAD V | ... | BAD V |
| $TEMP_2$ | GOOD V | BAD V | GOOD V | ... | BAD V |
| ... | BAD V | BAD V | BAD V | ... | BAD V |
| ... | GOOD V | GOOD V | BAD V | ... | GOOD V |
| ... | GOOD V | GOOD V | GOOD V | ... | GOOD V |
| $TEMP_N$ | BAD V | GOOD V | GOOD V | ... | GOOD V |

FILTER INTEGRATION FOR A LUBRICATION ANALYSIS SYSTEM

CROSS-REFERENCE TO RELATED APPLICATIONS

This application claims the benefit of U.S. Provisional Application Ser. No. 60/371,104 entitled Systems and Methodologies for Enhancing Machine Reliability, filed on Apr. 9, 2002—the entirety of this application is incorporated herein by reference.

TECHNICAL FIELD

The present invention generally relates to an integrated filtering and in situ monitoring and health assessment system for lubricants and hydraulic fluids.

BACKGROUND OF THE INVENTION

Dynamoelectric machines such as motors and generators and other rotating machines such as gears, compressors, hydraulic pumps, and bearing systems are widely employed in industrial and commercial facilities. These machines are relied upon to operate with minimal attention and provide for long, reliable operation. Many facilities operate several hundred or even thousands of such machines concurrently, many of which are integrated into a large interdependent process or system. Like most machinery, at least a small percentage of such equipment is prone to failure. Some of such failures can be attributed to loss of lubrication, incorrect lubrication, lubrication breakdown and/or lubrication contamination. For example, studies have shown that lubrication error accounts for as much as 50% of all bearing failures.

Depending on the application, the failure of a machine in service can possibly lead to system or process down time, inconvenience, material scrap, machinery damage, hazardous material cleanup and possibly even a dangerous situation. Thus, it is desirable to diagnose the machinery for possible failure or faults early in order to take preventive action and avoid such problems. Absent special monitoring for certain lubrication problems, the problem may have an insidious effect in that although only a minor problem on the onset, the problem could become serious if not detected and appropriate action taken. For example, bearing problems due to inadequate lubrication, lubrication contamination or other causes may not become apparent until significant damage has occurred.

Proper lubrication facilitates extension of machinery life. For example, when motor lubricant is continuously exposed to high temperatures, high speeds, stress or loads, and an oxidizing environment, the lubricant will deteriorate and lose its lubricating effectiveness. The loss of lubricating effectiveness will affect two main functions of a lubrication system, namely: (1) to reduce friction; and (2) to remove heat. Continued operation of such a degraded system may result in even greater heat generation and accelerated system degradation eventually leading to substantial machinery damage and ultimately catastrophic failure. To protect the motor, the lubricant should be changed in a timely fashion. However, a balance must be struck—on one hand it is undesirable to replace an adequate lubricant but on the other hand it is desired to replace a lubricant that is in its initial stages of breakdown or contamination before equipment damage occurs. Since each particular application of a lubricant is relatively unique with respect to when the lubricant will breakdown or possibly become contaminated, it becomes necessary to monitor the lubricant.

Various techniques for analyzing lubricants are known. For example, measuring a dielectric constant change in the lubricant or recording a thermal history of the lubricant have been employed for monitoring the lubricant's condition. However, these methods measure a single parameter and require the use of the same lubricant or assume no machinery malfunctions throughout the measurements. Furthermore, these monitoring techniques are generally not performed in situ and typically require that a sample of the lubricant be extracted and analyzed using laboratory grade equipment to determine the condition of the lubricant. The need to monitor and determine the current and future health of lubricants include grease and oils such as used in bearing systems for motors, gears, pillow blocks, hydrodynamic bearings as well as hydraulic fluids such as found in pumps and pump systems, and cutting fluids, refrigerants such as used in HVAC systems and fuel such as employed in cars, aircraft, off-road vehicles and marine systems to name a few.

Single parameter sensors only provide a narrow view of a lubricant quality and/or health. Accurate lubricant health assessment and lifetime prediction is virtually impossible to achieve via sensing a single parameter of the lubricant. The need for more information about the lubricant is readily apparent from the many parameters which are reported in a typical laboratory report of lubricant condition.

SUMMARY OF THE INVENTION

The present invention provides a lubrication analysis system which takes into account a plurality of parameters relating to lubrication health and allows for concurrent filtering and in situ monitoring of lubricating fluid within an operating environment. More particularly, the present invention provides a successful integration of multiple sensors into a lubrication filter assembly whereby meaningful data is provided relating to the health of the lubrication. Even more particularly, the present invention provides a filter-sensor integration in which one or more sensing devices are positioned relative to the filter to sense in situ various parameters of the lubricating fluid. The sensing devices can be mounted onto a lubrication sensing assembly, which can be embedded into an interior chamber of a lubrication filter assembly. The filter-sensor integration can thus obtain data regarding lubrication entering into a certain part of a motor or machine, such as a gearbox.

The sensing device(s) include(s) sensors for measuring certain parameters of the lubricating fluid, such as pH, TAN, chemical characteristics, optical characteristics, electrochemistry, electrical conductivity, temperature and/or viscosity. The device(s) can be made via integrated circuit-type microfabrication techniques that accommodate automatic batch production whereby the sensing devices can be economically manufactured. Additionally, and more importantly (at least from a non-economic point of view), the microfabrication techniques allow lubrication sensing devices to be made of a reduced size while still providing superior sensing capabilities. This reduction in size (without sacrifice of accuracy) allows in situ monitoring of lubricating fluid within a filter operating environment as compared to extracting a sample and/or testing the lubricant at a remote site. The sensors may be formed on one or both sides of a silicon base and/or a flexible base, or alternatively may be formed directly on the filter or filter assembly, such as on the filter assembly base.

In the lubrication analysis system according to the present invention, a processor receives lubrication-related data from the sensing device(s), processes the lubrication-related data, and provides information relating to lubrication health. In this manner, the system can determine present health of the lubrication so that any problems can be diagnosed at an early stage and corrected prior to damage occurring. Moreover, the invention allows lubrication data analysis to provide insight to early onset of mechanical faults independent from inadequate lubrication. For example, a sudden increase in debris, contaminants and/or temperature can be indicative of excessive loading, seal failure, or other mechanical problems even if an absolute value of such parameter increases are within an acceptable range for the lubricant itself.

One aspect of the present invention relates to a filter-sensor integration including a lubrication filter assembly and at least one lubrication sensing device. The lubrication filter assembly includes a base and a filter material. Typically the base and filter material are cylindrical in shape and hollow, creating an interior chamber—although any suitable scheme (e.g., male/female configuration, single fabricated integrated structure, flat circular filter disc, . . . ) for integrating a filter and sensing system can be employed in accordance with the subject invention. The lubrication sensing device includes a plurality of sensors that sense respective modalities relating to a lubricant and/or a lubricant environment. Generally, a lubrication sensing system is created which includes a base, a perpendicular extension of the base, and a plurality of sensors on a sensor array. The lubrication sensing device can be positioned within an interior chamber of the lubrication filter assembly so that the sensors collect in situ parameters respectively of the lubricating fluid and/or environment.

Another aspect of the present invention relates to a lubrication filter assembly lubrication analysis system. The system includes a lubrication filter assembly, wherein a lubricant enters an interior chamber of a lubrication filter assembly by traversing filter material. A first sensing means senses a first parameter of the lubricant, a second sensing means senses a second parameter of the lubricant; and a processing means operatively coupled to the first and second sensing means, analyzes the sensed lubricant parameters.

Still another aspect of the present invention relates to a filter-sensor integration that includes a lubrication filter assembly, wherein a lubricant enters an interior chamber of the lubrication filter assembly by traversing filter material. A lubricant sensor is embedded in a chamber of the lubrication filter assembly such that at least a portion of the sensor is in contact with the lubricant—the lubricant sensor can include a plurality of sensors such as for example: a pH sensor; TAN sensor; a chemical sensor; a conductivity sensor; an electro chemistry, surface acoustic wave (SAW) sensors, and a temperature sensor.

Still another aspect of the present invention relates to a system and method for controlling operation of a motor, recirculating valve, or additive pump wherein at least one of the parameters sensed by the sensor arrays is utilized as an input to a control component. The control component can operate the motor, valve or pump based at least in part on data received from the sensor arrays.

The present invention facilitates analysis, diagnosis, prognosis and maintenance of fluids and mitigates costs associated therewith. The integrated fluid filter-sensor can be applied to a plurality of diverse applications and can be employed to dynamically control quantitative and qualitative aspects of the fluids in order to mitigate effects such as degradation, depletion, contamination and oxidation, for example. As an example of the diversity provided by the present invention, embedded applications can include automotive (e.g., engine, drive train, cooling systems, fuels), industrial machinery (e.g., gears, bearings, solvents, process chemicals, cutting fluids, hydraulic fluids), aircraft (oil, hydraulic fluid, fuel, refrigerants), food processing (e.g., oils, preservatives), and medical (e.g., in-vivo applications, medicines, other bio-fluids).

In accordance with one aspect of the present invention, a multifunctional and modular system is provided that includes one or more sensors to monitor fluids such as lubricants, hydraulics, oils and greases, for example. Information received by the sensors is then processed to determine if the fluids are functioning according to predetermined ranges of suitable fluid operating parameters. If it is determined that one or more parameters are outside of the predetermined operating ranges, proactive action can be taken to dynamically adjust one or more of the fluid parameters—even during operation of related machinery or other equipment.

Dynamic adjustments to fluids can include adjusting fluid levels and chemical deficiencies in the fluids along with adjusting characteristics of the fluid based upon environmental considerations (e.g., making fluid adjustments such as adding new fluid or adding specific additives according to duty cycle, load, and temperature of associated equipment). The sensor information can also be provided to external control systems to adjust operating characteristics in accordance with the current detected state of the fluids. For example, if a fluid were determined to be running hotter because of depletion, the sensor information can be employed to adjust the speed or torque of a controller and related equipment to reduce thermal loading of the lubricant in order to extend the life of the lubricant.

Another aspect of the present invention includes utilizing the sensor information collected above to further enhance diagnostic and prognostic aspects of the present invention. This can include providing data quality metrics along with sensor information to indicate not only the operating characteristics of fluids but also to indicate information that relates to the health or status of the sensor reporting the fluid information. In this manner, equipment can be better maintained since information is provided according to the current operating status of the fluids indicating when corrective actions are needed. To further facilitate the process, predictive information is provided relating to the quality of the components that detect when the corrective actions are needed, thus increasing the overall confidence and accuracy of the system.

According to another aspect of the present invention, fluid operating life is extended to further reduce maintenance and costs associated with fluid replacement. This can be achieved by exciting one or more electrodes via excitation pulses to reduce oxidation present in the fluid (e.g., lubricant). In addition, other processes can include energizing one or more magnetic or other type structures to facilitate removal of metallic particles that may have accumulated in the fluid—thus, enhancing operational life of the fluid. By reducing oxidation and contaminants in the fluid, effective fluid lifetime can be extended. Thus, with respect to lubricants, a period required for re-lubricating equipment can be extended and possibly, a lubrication cycle can be eliminated. Consequently, maintenance costs and equipment downtime can be mitigated. Costs can also be saved by deferring re-lubrication until a future plant shutdown and/or scheduled downtime due to the extended life of the lubricant.

Sampling and subsequent restorative operations provided to fluids can occur as an on-going process, in real time on demand and as part of a closed loop feedback process. Thus, the present invention can incorporate a multi-element fluid health sensor along with processing and control aspects to not only determine but also to change or affect the overall health of fluids. Sensors can be implemented in accordance with the present invention for in situ sensing of fluids such as greases and oils among other fluids, wherein the parameters sensed such as ferrous contamination and oxidation include several critical and prevalent parameters indicating fluid health. Consequently, the health of fluid can be characterized in order to indicate remaining fluid lifetime—for example, in order to specify and control when (in the future) bearings, gear boxes, and/or other systems need to be re-lubricated. Maintenance engineers can then be directed to perform the system maintenance within prescribed times and in some cases less often. This facilitates having the engineer move from a preventive maintenance strategy (e.g., lubricate equipment based on a timed schedule) to a predictive maintenance strategy (e.g., only lubricate equipment when needed to minimize operating costs and extend equipment lifetime), wherein the control aspects of the present invention further mitigate maintenance efforts by automatically sensing and subsequently operating upon lubricant characteristics.

In accordance with another aspect of the present invention, a lubricant analysis system includes an integrated filter and micro-viscosity sensor which includes an array of finger-like elements extending perpendicular to the surface of a semiconductor base, the array of finger-like elements being oscillated at a predetermined frequency, wherein the power required to maintain oscillation of the array of finger-like elements at the pre-determined frequency corresponds to the viscosity of the fluid. The system also includes a lubrication analyzer which includes a processor operatively coupled to the at least one micro-viscosity sensor, the processor adapted to process data output from the at least one micro-viscosity sensor to determine the viscosity of the fluid.

Another aspect of the invention provides for using information from the multi-element fluid sensor to determine the condition (and future condition) of the machinery and components. For example, the presence of coolant in the oil may indicate that seals have failed. The presence of high oxidation levels may indicate a gearbox operating at extremely high torsional loads due to hydrodynamic bearing failures.

Another aspect of the invention provides for performing a diagnosis of the integrated fluid and mechanical system. For example, reduced viscosity due to high fluid shear rates may cause increased fluid shear, reduced lubricating film thickness and eventually metal-to-metal contact leading to bearing failure.

Another aspect of the invention provides for integrating sense elements on the "outside" of the filter.

Another aspect of the invention provides for integrating sense elements on both the inside and outside of the filter.

Another aspect of the invention provides for integrating other sense modalities (e.g., pressure, vibration, acoustic) with the fluid sensor. This can further improve accuracy in diagnosing and predicting machinery failure.

Another aspect of the present invention relates to a method for fabricating a micro-viscosity sensor, including etching a semiconductor substrate to form an array of finger-like elements which extend perpendicularly from a base of the substrate, the array of finger-like elements adapted to oscillate over a range of frequencies, wherein the power required to maintain oscillation of the array of finger-like elements at a particular frequency corresponds to the viscosity of a fluid being sensed.

These and other features of the invention are fully described and particularly pointed out in the claims. The following descriptive annexed drawings set forth in detail certain illustrative embodiments, these embodiments being indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 13 illustrates a table that can be accessed when performing analyses to diagnose state of a fluid.

FIG. 14 is a representative table diagram of fluid viscosity health states based upon actual power requirements to maintain oscillation of the array of finger-like elements at a particular frequency at particular temperatures.

DETAILED DESCRIPTION OF THE INVENTION

Figure 1A:
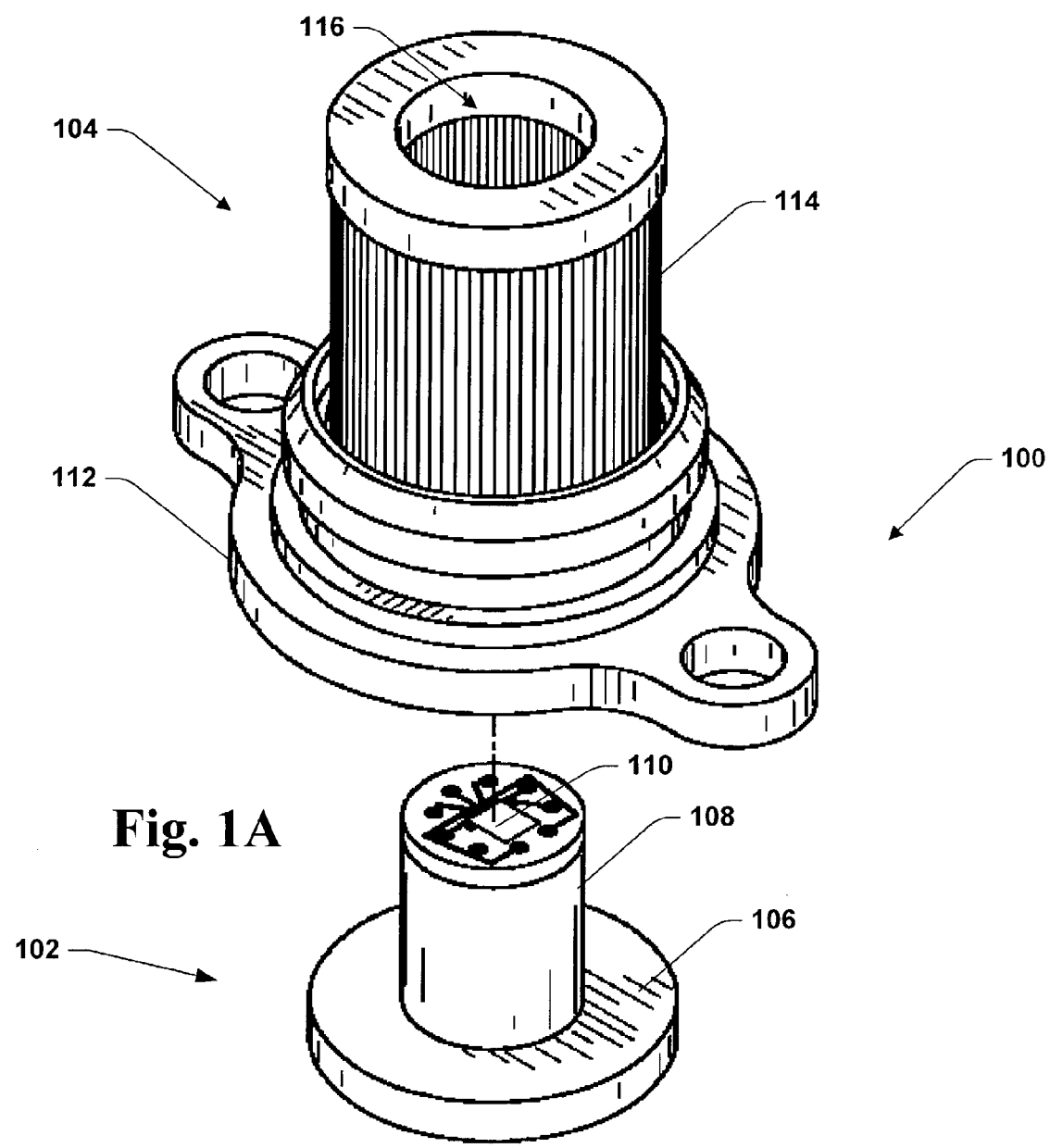
FIG. 1A is a perspective illustration of an exemplary integrated filter-sensor system in accordance with an aspect of the present invention.

The present invention is now described with referent to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" or "system" are intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring now to the drawings in detail, and initially to FIG. 1A, an exemplary embodiment of a filter-sensor system 100 integrating a sensing assembly 102 with a filter 104 is depicted. The filter-sensor system 100 measures, determines, analyzes, monitors, and/or controls fluid (which can be a gas) based on readings received from one or more sensors modularly integrated with the filter assembly 104. The exemplary sensing assembly 102 comprises a base 106, an extension 108 which protrudes perpendicular from the base 106, and a sensor array 110 mounted to the extension 108. The sensor array 110 can be extremely small and lightweight, thereby allowing weight sensitive machinery to operate without redesign. In particular, the subject invention provides for integrating a sensing system with a filter such that size and shape of the filter as compared to a conventional filter counterpart are insubstantially changed.

In accordance with one aspect of the present invention, a machinable metal (e.g., aluminum) is employed to fabricate the base 106 and stand 108 of the sensing assembly 102; however, any suitable material can be used to fabricate the sensing assembly 102. The sensor array 110 can be fabricated on a machinable ceramic, however any suitable material can be used. The sensor array 110 can comprise several separate sensors, including but not limited to a pH sensor, an electrochemical sensor, a conductivity sensor, a viscosity sensor, a temperature sensor, a pressure sensor, an IR sensor, a light sensor, a density sensor, a light transmission sensor, a shear sensor, velocity sensor, an accelerometer, glucose sensor, metal detector, voltage sensor, current sensor, electro-magnetic field sensor, radiation sensor, and any suitable other type of sensor. A suitable sensor array that can be used in conjunction with the present invention is shown and described in detail in U.S. Pat. No. 6,196,057, entitled INTEGRATED MULTI-ELEMENT LUBRICATION SENSOR AND LUBRICAN HEALTH ASSESSMENT, the entire disclosure of which is hereby incorporated by reference. As discussed in greater detail infra the sensing assembly can also include a processing system and/or communications system for respectively analyzing data gathered by the respective sensors and relaying results of the analysis to remote components or systems.

The filter assembly 104 provides an effective housing for the sensing assembly 102. The exemplary filter assembly 104 comprises a base 112 and a filter material 114. The filter assembly 104 is shaped as a hollow cylinder, which forms an interior chamber 116 wherein the sensing assembly 102 can be modularly inserted into the interior chamber 116 of the filter assembly 104. The base 112 of the filter assembly 104 provides a mechanical mounting structure for the sensing assembly 102. While FIG. 1 displays one exemplary sensing assembly 102 and filter assembly 104, the present invention can be utilized in conjunction with any sensing and filter assemblies which integrates the respective assemblies in accordance with the subject invention. The sensing assembly can be attached to the filter flange 112 with machine screws, for example. Furthermore, the sensing assembly 102 need not include a base and/or a stand. The base 106 and stand 108 are illustrated to show one particular example of how the sensing assembly 102 can be integrated with the filter assembly 104. It is appreciated that filter design and shapes can vary as a function of application, and the subject invention is intended to encompass such designs and shapes that accommodate integration of a sensing and filter assembly in accordance with the subject invention. For example, equipment can be safely removed from service or located at a service depot in an efficient and orderly manner based on the predicted time for fluid maintenance. Fluid refurbishment using fluid cleaning and fluid restoration carts can be similarly scheduled. Furthermore, the effectiveness of fluid refurbishing can be quickly determined even during fluid re-cycling through the service cart. Moreover, as discussed in greater detail below, a processing system can be incorporated into the fluid sensing assembly 102 to perform data acquisition, sensor fusion, analyzer functions, local power, display, communications, afford self diagnosis, establish fluid health, predict when fluid service is required, and/or verify feasible operating regimes.

Furthermore, such processing system can employ explicitly as well as implicitly trained classifiers in connection with inferring which fluid parameters (e.g., temperature, pH, conductivity . . . ) to compute and/or relay to other external components (e.g., a control component, a display component, a storage component . . . ). For example, a processing system can be implicitly trained by watching an operator over time to learn how the operator typically operates a machinery requiring lubrication. The processing system can employ a utility-based analysis wherein a cost/benefit analysis can be applied with respect to taking action in connection with a determined and/or inferred state of the fluid.

By embedding the lubrication sensing array 110 into the filter assembly 104 the actual fluidic material entering into machinery (e.g., a gearbox) can be dynamically sensed and analyzed. The small size and weight of the sensing array 110 allows the corresponding sensing assembly to be integrated into virtually any filter assembly. Based on data collected from the sensors on the sensing array 110, a processing system can determine when the fluid needs to be serviced or replaced, or when the fluid is unacceptable for use (e.g., fuels). Furthermore, a classifier can be employed to determine when the filter material 114 needs to be clean/replaced. Finally, by integrating the sensor assembly 102 with the filter assembly 104, cost of placing more sensors throughout specific components of a machine can be mitigated. Additional points of potential leakage is minimized and structural (e.g., drilling) changes are mitigated.

Figure 1B:
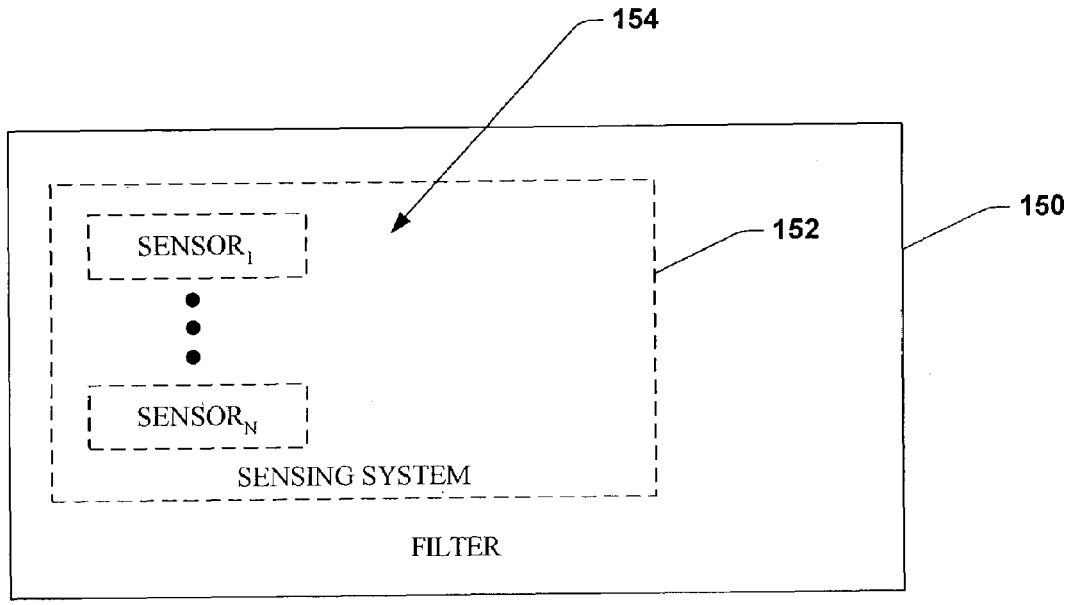
FIGS. 1B-1E are high-level schematic diagrams of exemplary integrated filter and sensing systems in accordance with the subject invention.

FIG. 1B is a high-level schematic illustration of a filter 150 with a sensing system 152 integrated therewith. The sensing system 152 can be integrated with the filter such that it is modularly insertable and/or removable so as to facilitate replacement of either the filter 150 or the sensing system 152. The sensing system 152 comprises N number of sensors 154 (N being an integer). The sensors 154 can be of a variety of types, respectively such as for example: a pH sensor, TAN, dielectric, an electro-chemical sensor, a conductivity sensor, a viscosity sensor, a temperature sensor, a pressure sensor, an IR sensor, a light sensor, a density sensor, a light transmission sensor, a shear sensor, velocity sensor, an accelerometer, glucose sensor, metal detector, voltage sensor, current sensor, electro-magnetic field sensor, radiation sensor, and any suitable other type of sensor. Moreover, it is to be appreciated that with respect to certain modalities to be sensed, redundant sensors can be employed with the sensing system 152. Redundancy can be employed for example in connection with ensuring data integrity, accuracy, reliability, cross-validation, averaging, trending, back-up . . . .

Figure 1C:
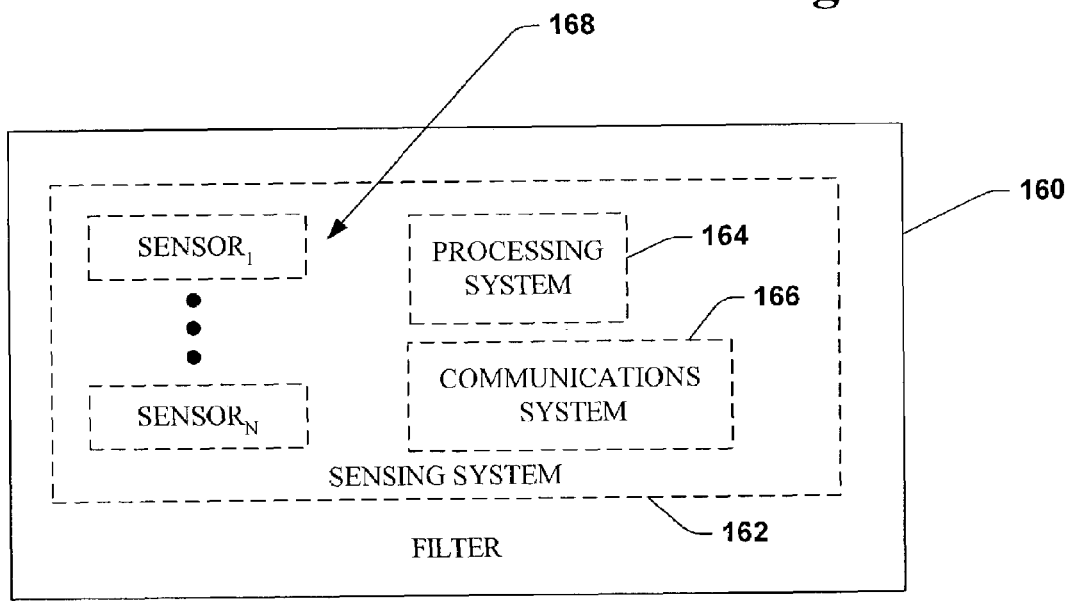

FIG. 1C is a high-level schematic illustration of another embodiment of a filter 160 with a sensing system 162 integrated therewith. The sensing system 162 can be integrated with the filter such that it is modularly insertable and/or removable so as to facilitate replacement of either the filter 160 or the sensing system 162. It is to be appreciated that the filter 160 and sensing system 162 can be formed as a single integrated unit. The sensing system 162 comprises N number of sensors 168 (N being an integer). The sensing system 162 further includes a processing system 164 and a communications system 166 for respectively analyzing data gathered by the sensors 168 and communication with other components and/or systems.

Figure 1D:
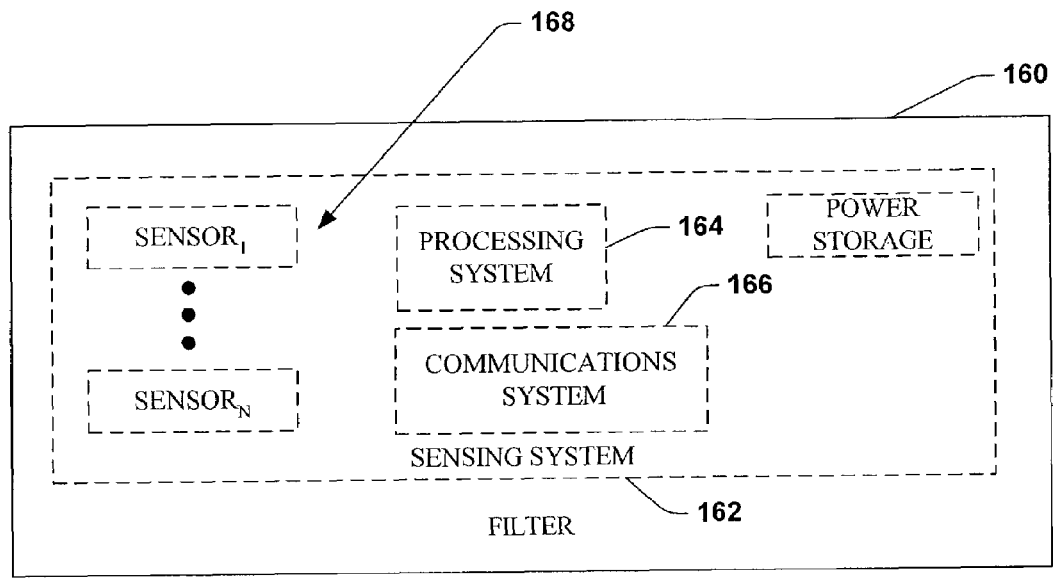
Figure 1E:
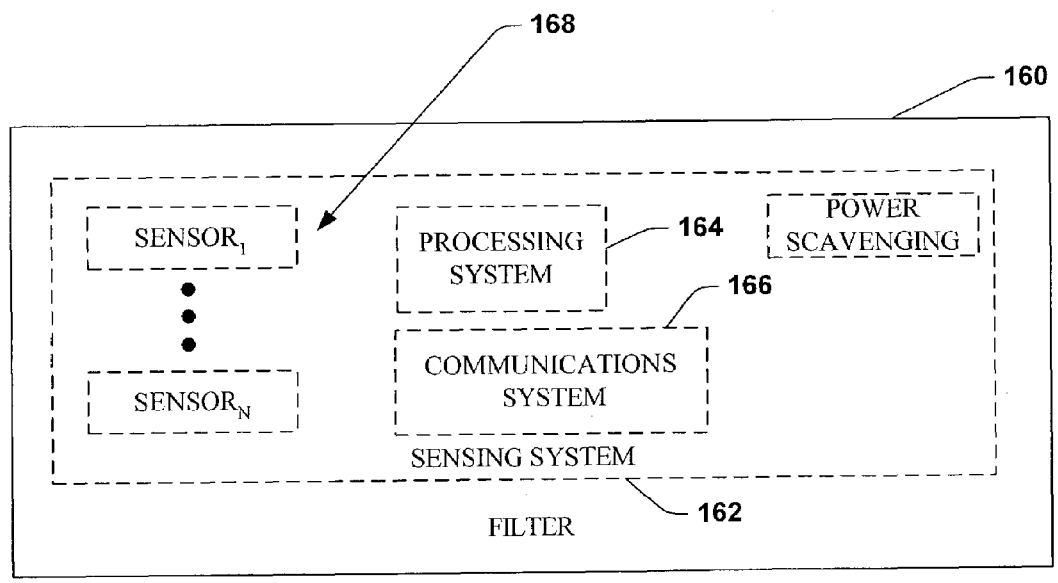

FIGS. 1D & 1E, respectively illustrate employment of a power storage device and power scavenging system in accordance with the subject invention.

Figure 2:
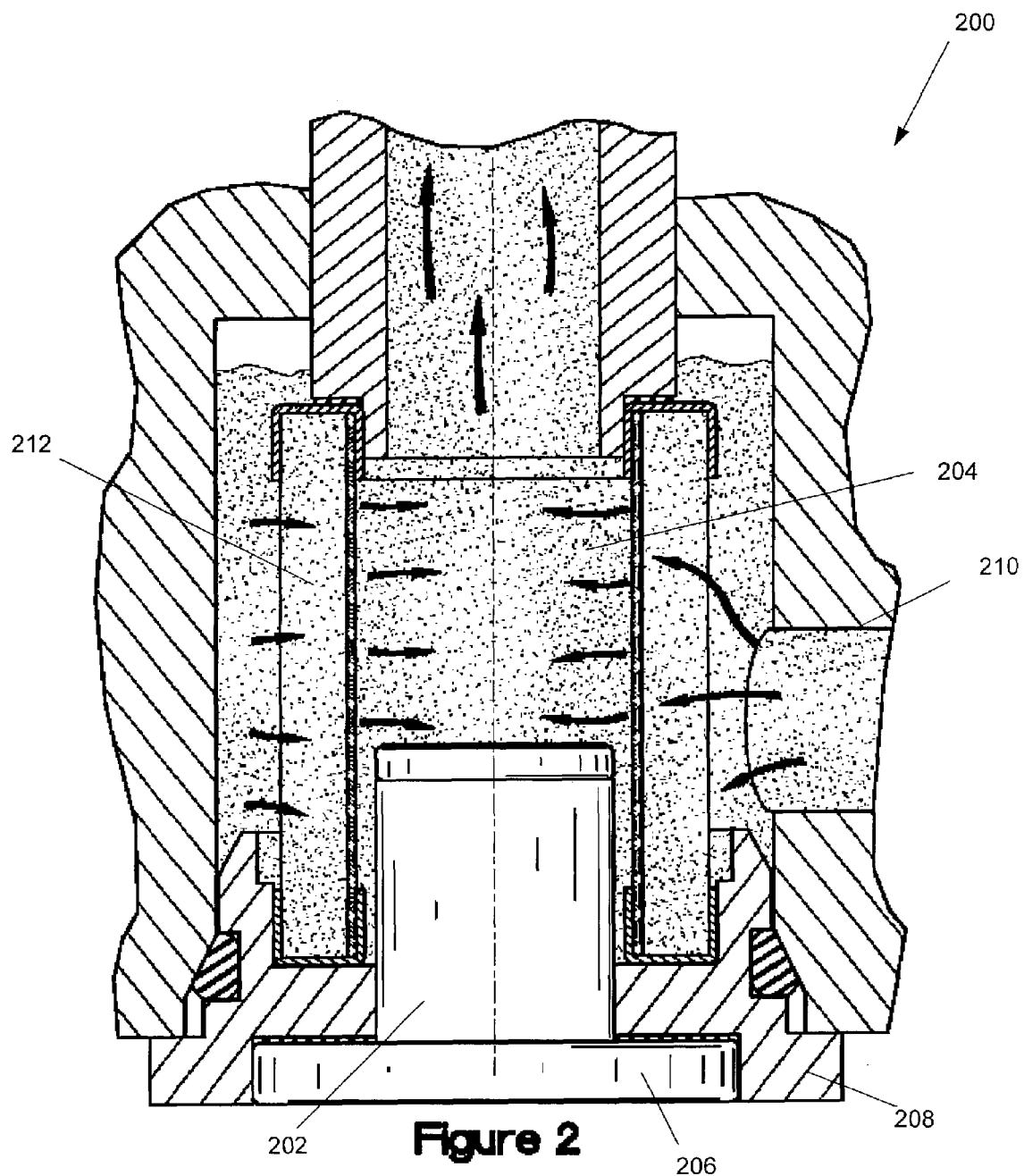
FIG. 2 is a cross-sectional diagram of an exemplary integrated filter-sensor system in accordance with an aspect of the present invention.

Referring now to FIG. 2, a cross-sectional view of an exemplary fluid-analysis system 200 which integrates a sensing assembly 202 with a filter assembly 204 is displayed. The sensing assembly 202 is integrated the filter assembly 204 to allow for continuous in situ sensing and analysis of material flowing through the filter assembly 204. In one embodiment of the present invention the sensing assembly 202 remains in a stable position with respect to the filter assembly 204 via securing the base 206 of the sensing assembly 202 to the base 208 of the filter assembly 204 (e.g., through the use of bolts, screws, adhesive, or any other means for securing).

A pipeline 210 facilitates movement of fluid into the filter assembly 204, thereby requiring the fluid to enter an interior chamber of the filter assembly 204 by traversing through filter material 212. The filtered fluid then passes over the sensing assembly 202 where a sensor array (not shown) secured to the top of the sensing assembly 202 senses various parameters of the fluid, such as for example: pH, TAN, chemical makeup, dielectric, conductivity, viscosity, and/or temperature. The sensor array can relay information to a processor to allow for real-time data analysis derived from the sensors in the sensor array. The processor can be located directly on the sensing assembly 202 or external to the operating environment. Furthermore, fluid can enter and exit the filter assembly 204 by any suitable means. For example, more than one pipeline can supply fluid to the filter assembly 204, and the fluid can be delivered through the pipeline(s) via pump, gravity, etc. Similarly, the fluid chamber surrounding the filter may be large as in a fluid filled gearbox or lubricant reservoir.

Figure 3:
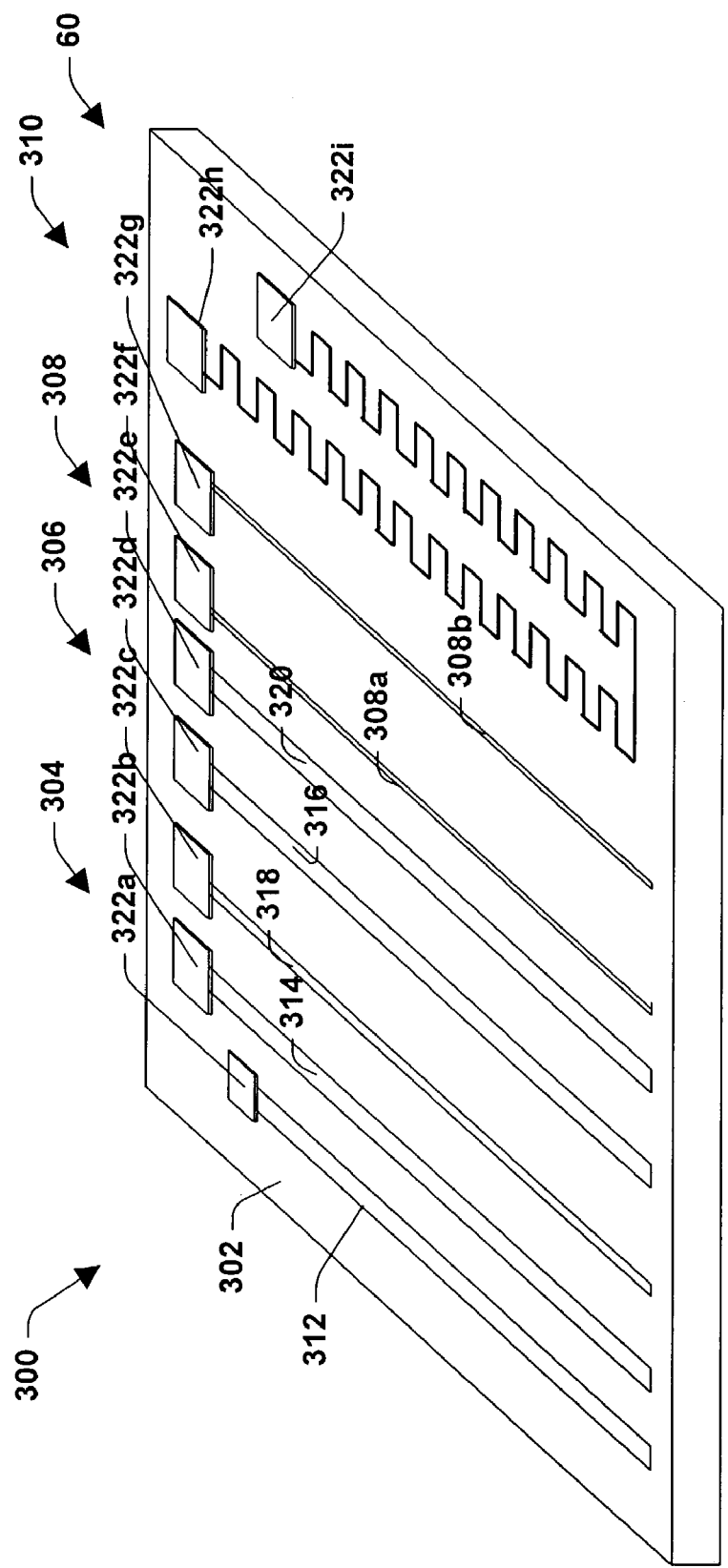
FIG. 3 is a perspective diagram of an exemplary sensor array in accordance with an aspect of the present invention.

Turning now to FIG. 3, an exemplary fluid sensing device 300 is shown in perspective view. The illustrated sensing device 300 can be made in accordance with integrated circuit-like fabrication techniques thereby making it possible for the device 300 to have a relatively small geometry, such as a substantially flat square shape having an approximately 4 $mm^2$ area or smaller. Thus, the sensing device 300 is desirable for filter-sensor integrations wherein space is at a premium but accuracy, reliability, and sensitivity of measured data are equally as important. Furthermore, the integrated circuit-like fabrication procedures allow the efficient and economic manufacture of large batches and/or high production yields.

The illustrated sensing device 300 includes a semiconductor base 302, made of silicon or any other suitable material, and a plurality of sensors formed on the base 302. The illustrated sensors include a pH sensor 304 (to determine ionic conditions); a chemical sensor 306 (to determine the presence of chemical contaminants); an electrical conductivity sensor 308 (to determine the presence of metal/water contaminants); and a temperature sensor or detector 310 (to determine temperature and facilitate determining viscosity). The pH sensor 304 includes a reference electrode 312 and a pH electrode 314. The chemical sensor 306 includes a reference electrode 316, a working electrode 318, and a counter electrode 320. The conductivity sensor 308 includes two metal electrodes 308a and 308b. The temperature sensor or detector 310 is essentially a pattern (having known geometric dimensions) formed on the base 302 from a material having an electrical conductivity that varies within the expected range of temperatures. The lubrication sensing device 300 further comprises respective sets of contact pads 322a-322i coupled to the sensors 304, 306, 308 and 310.

Depending on the particular filter-sensor integration, the illustrated sensing device 300 can be acceptable and even preferable. However, other sensing devices are possible with and contemplated by the present invention, and may be more advantageous in certain filter-sensor integration situations. For example, depending on desired data collection, certain sensors can be omitted, certain sensors can be repeated, sensitivities of replicated sensors sealed to cover a wide dynamic range, and/or different types of sensors can be added. For a specific example, a viscosity sensor can be provided that works in conjunction with the temperature sensor 310 to measure viscosity of the fluid. (A suitable viscosity sensor is shown and described in U.S. Pat. No. 6,023,961, entitled MICRO-VISCOSITY SENSOR AND LUBRICATION ANALYSIS SYSTEM EMPLOYING THE SAME, the entirety of which is incorporated herein by reference.)

Additionally or alternatively, instead of the rigid silicon substrate base 302, the sensors 304, 306, 308 and 310 could be fabricated on a flexible substrate material to accommodate differing filter-sensor integrations. Also, the sensors 304, 306, 308, and 310, could be located on both sides of the rigid or flexible substrate base 302. Alternatively, the sensors 304, 306, 308, and 310 could be "printed" on the interior filter chamber itself (e.g., using techniques such as sputtering) to eliminate need for the substrate 302. Or the sensors may be "printed" on an exterior of the filter or both the interior and exterior of the filter element.

Figure 4:
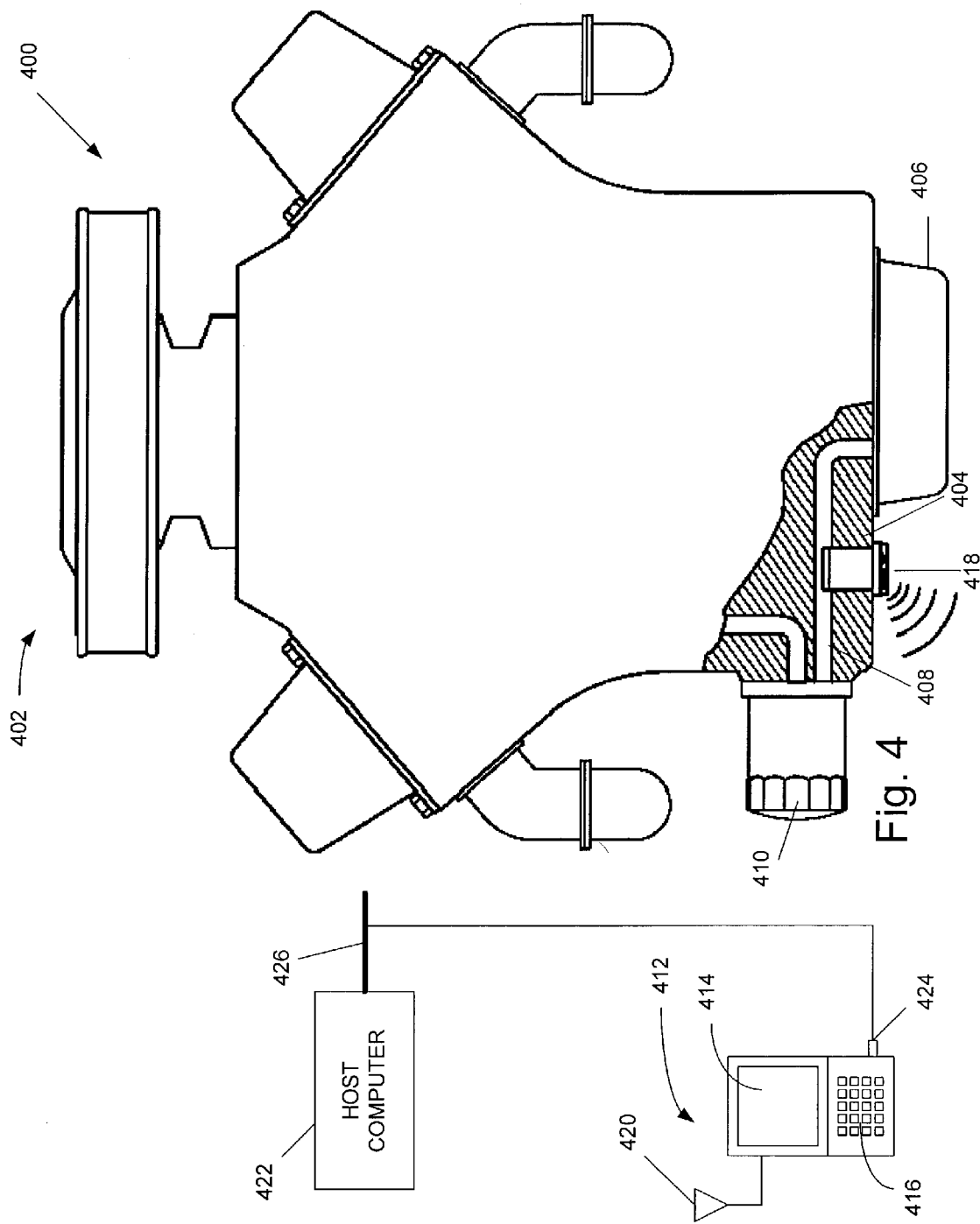
FIG. 4 is an exemplary operating environment of an integrated filter-sensor in accordance with an aspect of the present invention.

Referring now to FIG. 4, an exemplary environment for a bearing-sensor integration in accordance with the present invention is schematically depicted. In the illustrated example, a lubrication analysis system 400 is employed in conjunction with a motor 402. The motor 402 can be of any suitable type having moving parts which require lubrication. In any event, the motor 402 includes at least one integrated lubrication sensor-filter 404. The lubrication sensor-filter 404 comprises a lubrication sensing assembly embedded into a filter assembly for example as illustrated in FIG. 1A. In the exemplary system of FIG. 4, the lubrication sensor-filter 404 is provided lubrication from an internal lubrication reservoir 406 via pipeline 408. The lubricating material travels through the sensor-filter 404 to a gearbox 410. The system 400 measures, determines, analyzes, monitors, and/or controls the lubrication health of the bearing based on readings received from one or more lubrication sensor-filter 404.

The lubrication analysis system 400 includes an analyzer 412 which, in the illustrated embodiment includes a display 414 for displaying lubrication-related information and a keypad 416 for entering data and/or commands. A sensor array (not shown) of the filter-sensor transmits data via a wireless transmitter/receiver 418 to the analyzer 412, which captures data with an antenna 420 relayed from the transmitter 418. However, data from the sensor-filter 404 can be relayed to the analyzer 414 through various other means, such as via a hard wire, bus, phone-line, etc. It is to be appreciated that the system 418 can be integrated into the engine oil filter 410.

The system 400 further comprises a host computer 422 that makes determinations as to the health of the lubrication, this determination preferably including performing data fusion of the sensed lubricant data (e.g., pH, chemical, conductivity, temperature) to facilitate condensing, combining, trending, forecasting, evaluating and interpreting the sensed data. The analyzer 412 includes a communications port 424 or other interface for receiving information from the lubrication sensing device(s) 404. Once the analyzer 412 (and more particularly its processor 430, introduced below) has processed the lubrication-related data, it is sent to the host computer 422 via a network backbone 426 (which may be hardwired and/or wireless). In this manner, the highly accurate and up-to-date information may be provided regarding the health of the lubrication. Data can be combined from multiple filter-sensors in the host computer 422 and lubrication health and future lubrication requirements may be communicated to plant maintenance, job scheduling, routing, and inventory systems as appropriate. The system 412 and 422 can be integrated with the filter sensor 410. Alternatively, analysis and action can be integrated with the driver console or pilot display.

Figure 5:
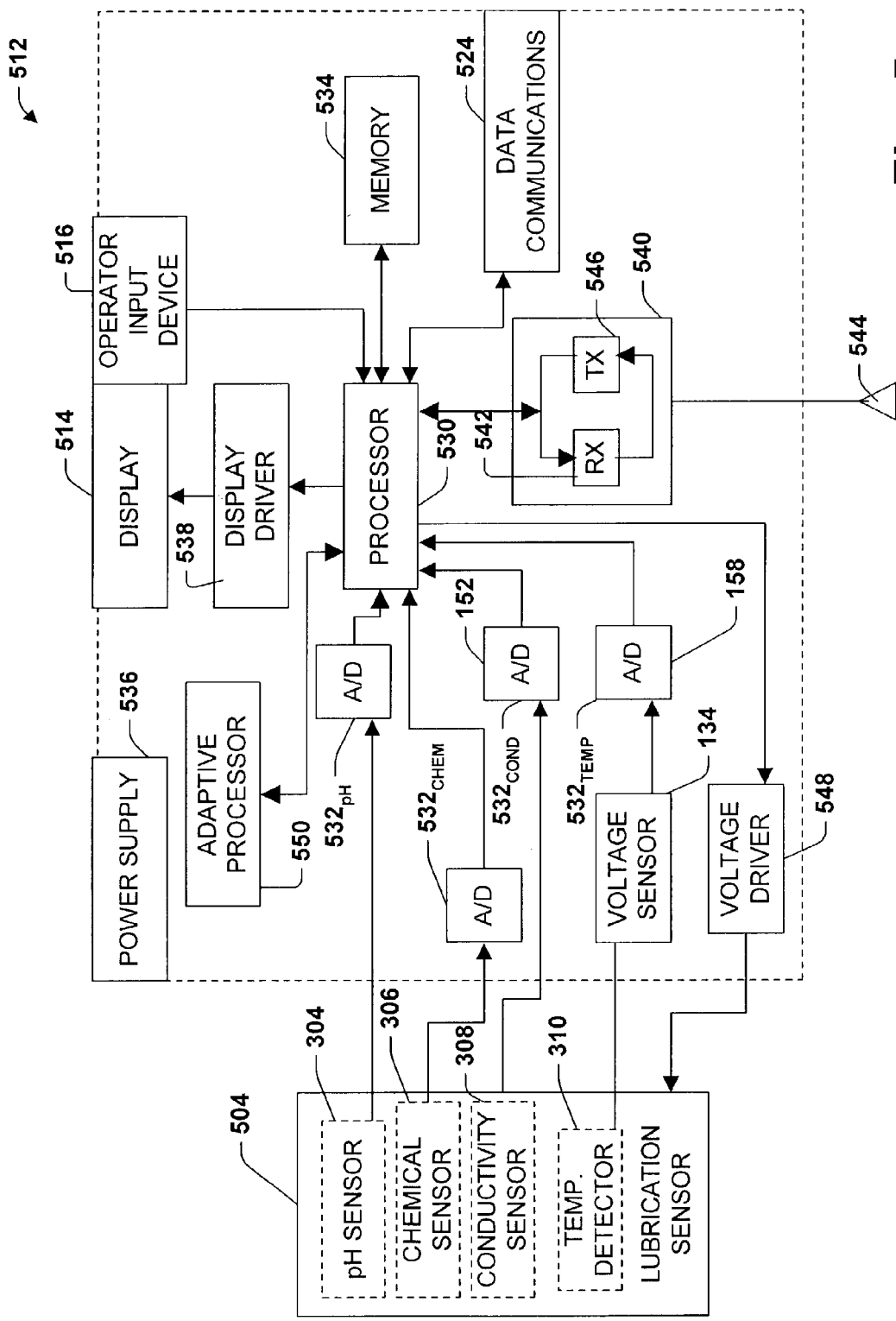
FIG. 5 is a block diagram of a data analyzer that can be utilized in conjunction with an aspect of the present invention.

Referring now to FIG. 5, further details of an analyzer 412, and its informational connection to the sensor array 110 of a fluid sensing device 504, are schematically shown. The fluid analyzer 512 includes a processor 530 that analyzes information received from the sensor array 110. To this end, the pH sensor 304, the chemical sensor 306, and the conductivity sensor 308 are directly coupled to A/D converters $532_{pH}$, $532_{chem}$, and $532_{cond}$, respectively. The temperature sensor (or detector) 310 is coupled to the A/D converter $532_{temp}$. The sensors 304, 306, 308, and 310 are each operatively coupled to the processor 530 via respective A/D converters 532. It is to be appreciated that multiple sensor systems can be networked together for integrated analysis and redundancy in accordance with the subject invention.

The analyzer 512 includes a memory 534 that stores program code, base-line information (e.g., nominal temperature, acceptable pH, expected electrochemistry, re-lube information, loading information, duty cycle data, and appropriate viscosity values), machine specific data, acceptable error bounds/deviations, historical fluid parameter data, and/or recommended corrective action. The analyzer 512 can also include a power supply 536 (that provides power to the processor 530, sensors and other components—the power supply 536 can be battery based, line-base, employ energy scavenging and/or photocells), a display driver circuit 538 (that couples the processor to the display 92), RF section 540 (that includes a receiver 542, an antenna 544, a transmitter 546 that transmits and receives signals), a voltage driver 548 (that provides the desired voltage to the sensing device 504), and/or an adaptive processor 550 (that analyzes health state of the fluid).

The fluid analysis system 512 is designed to provide highly accurate and up-to-date information regarding health of the fluid. Additionally, this system can compare known fluid health with acceptable parameters and projected fluid aging to establish a recommended maintenance action and when this maintenance should be performed. The sensor can compare measured data with stored baseline info. to determine amount and rate of change from time-sequenced historical data values. This information is then communicated to an operator or other computer system as appropriate. Depending on the particular analysis situation and/or the specific filter-sensor integration, the above-described analysis system 512 can be acceptable and even advantageous in certain situations. However, other analysis systems are possible with and contemplated by the present invention, and may even be preferable in certain filter-sensor integrations according to the present invention.

For example, all of the processing functions (data analysis, lubricant state estimation, health determination, etc.) performed by a host computer (not shown) in the illustrated embodiment could instead by performed by the processor 530 of the analyzer 512. In this arrangement, the processed results could be transmitted to a portable computer temporarily tied to the analyzer 512 and/or transmitted to a remote control computer. Additionally or alternatively, the processed results could be displayed locally on an analyzer display screen (not shown).

For another example, the analyzer 512 could be located remotely from a machine or host computer could carry out substantially all of the analyzer functions performed by the processor 530 in the illustrated system 512. Another option is to integrate the analyzer 512 (absent certain components, such as a display and the keypad) onto the same base (shown in FIG. 3) as the sensing device 504 and/or the filter assembly 104 (shown in FIG. 1) to provide for a substantially autonomous fluid analysis system that performs analyzer functions, affords self diagnosis, and verifies feasible operating regimes. Another option is to integrate the analyzer functions 512 into the sensor base 102 (FIG. 1) to provide a self-contained sensor analyzer module.

For a further example, transmittal of readings by the sensors 304, 306, 308, and 310 could be modified to fit a particular filter-sensor integration. In the illustrated analysis system 512, the analyzer 512 includes the communications port 524 or other interface for transmitting or receiving information from the remote computers, other sensing systems, personal computers or through network access (e.g., Ethernet). However, depending on placement of the filter within a machine, device or system, wireless sensor technology may be preferred with certain sensor-filter integrations, such as that shown in FIG. 4. To accomplish this wireless technology, low cost integrated silicon RF technology may be coupled to the on-board processor 530.

For a still further example, the analysis system 512 could additionally initiate automatic correction procedures. For instance, if the filter assembly 104 includes a forced lubrication system, the injection or draining of fluid could be automatically controlled based on the current fluid health analysis. Specifically, detection of low levels of fluid could automatically trigger injection of fresh fluid until an adequate level is reached. The presence of an unacceptable amount of contaminants could trigger a flushing of fluid to decontaminate the filter assembly environment. Additionally or alternatively, additives (such as anti-oxidant/desiccant substances) could be automatically introduced to stabilize fluid performance or even provide survival fluid performance during conditions of extreme wear, temperature, duty or mission critical applications. By introducing prescribed amounts of additives, fluid health assessment can be enhanced by monitoring the rate of degradation of the new material. It is also noted that while the analyzer 512 can perform a plurality of functions relating to fluid health, the processor 530 could be employed for the sole purpose of doing an emergency shutdown of a motor, device or system when fluid conditions approach a critical level. As another example, the analyzer 512 can indicate a degraded, but non-critical fluid condition. This permits using a fluid re-furbishing process rather that requiring that all the fluid be drained (and discarded) and new fluid be purchased and used to re-fill the system. The analyzer 512 may continue to operate during the refurbishment of fluid and dynamically monitor this process and indicated when the fluid has been refurbished (re-juvenated) to an acceptable level.

Figure 6A:
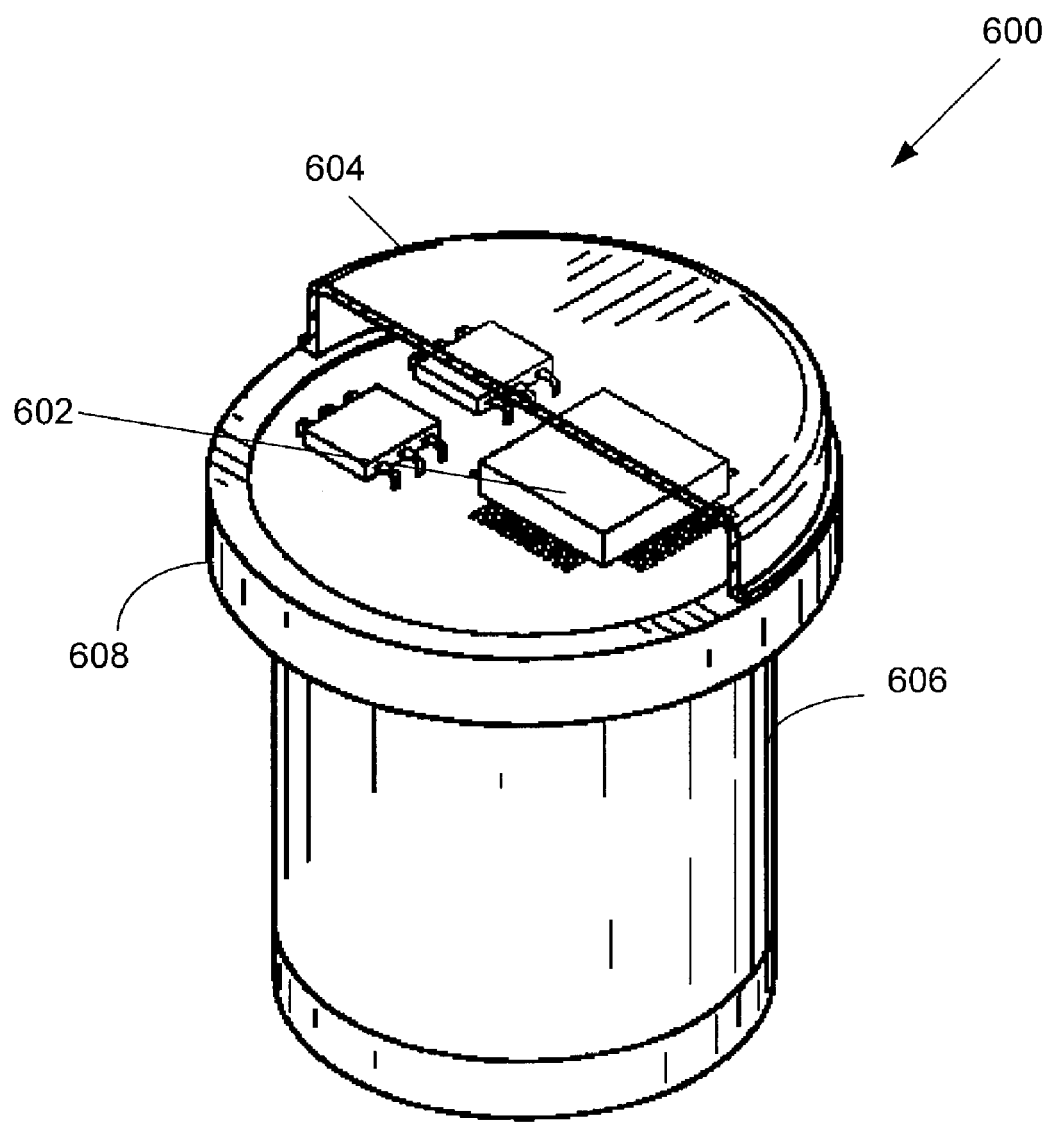
FIG. 6A is a perspective diagram of an exemplary lubrication sensing assembly in accordance with an aspect of the present invention.

Turning now to FIG. 6A, an alternative embodiment of a fluid sensing assembly 600 is illustrated. The fluid sensing assembly 600 includes all of the elements of the analyzer of FIGS. 4 and 5 excepting the display and input/output components. Due to decreasing size and increasing computing power of micro-processors and micro-controllers (as well as increasing memory capabilities) a processor and/or micro-controller 602 can be mounted directly to the fluid sensing assembly 600. Discrete components such as FPGA processors and logic, and ASIC devices can perform analog to digital filtering and computing functions, for example. A housing 604 will typically be added to the sensing assembly 600 to ensure that damage to the computing components (including processor 600) will be avoided. The necessary wiring between the processor 600 and the sensor array, in this embodiment located at the opposite end of the sensing assembly 600, can be placed through the base 606 and the extension 608 of the sensing assembly 600. A display and/or input/output component can be located externally from the sensing assembly 600, and data passed between the processor 602 and the display and/or input/output component through conventional wiring or via wireless transmitters/receivers. The computing components can furthermore be placed on the same side of the lubrication sensing assembly 600 as the sensor array. Power can be supplied to the computing components for example via a battery (e.g., lithium, Nickel Cadmium . . . ), or via energy scavenging systems (e.g., MEMS-based, temperature-based, rotation-based . . . ). Alternatively, a small LED or series of LEDs (e.g., green, yellow, red) can be integral to the device 604 and illuminate appropriately to display the fluid condition.

Figure 6B:
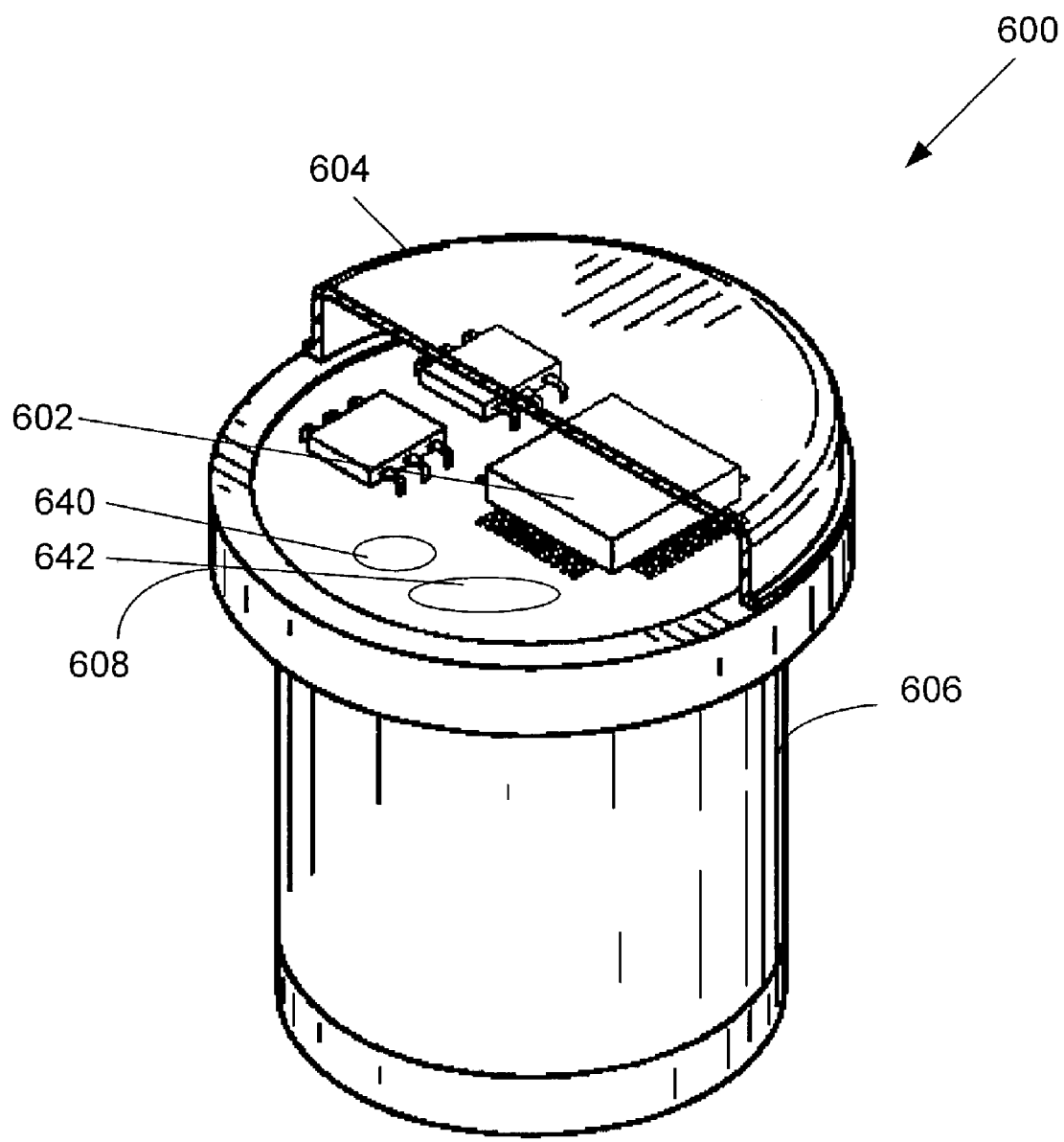
FIG. 6B illustrate an alternative embodiment wherein a battery and antenna are fabricated on the device.

FIG. 6B illustrate an alternative embodiment wherein a battery 640 and antenna 642 are fabricated on the device.

Figure 7:
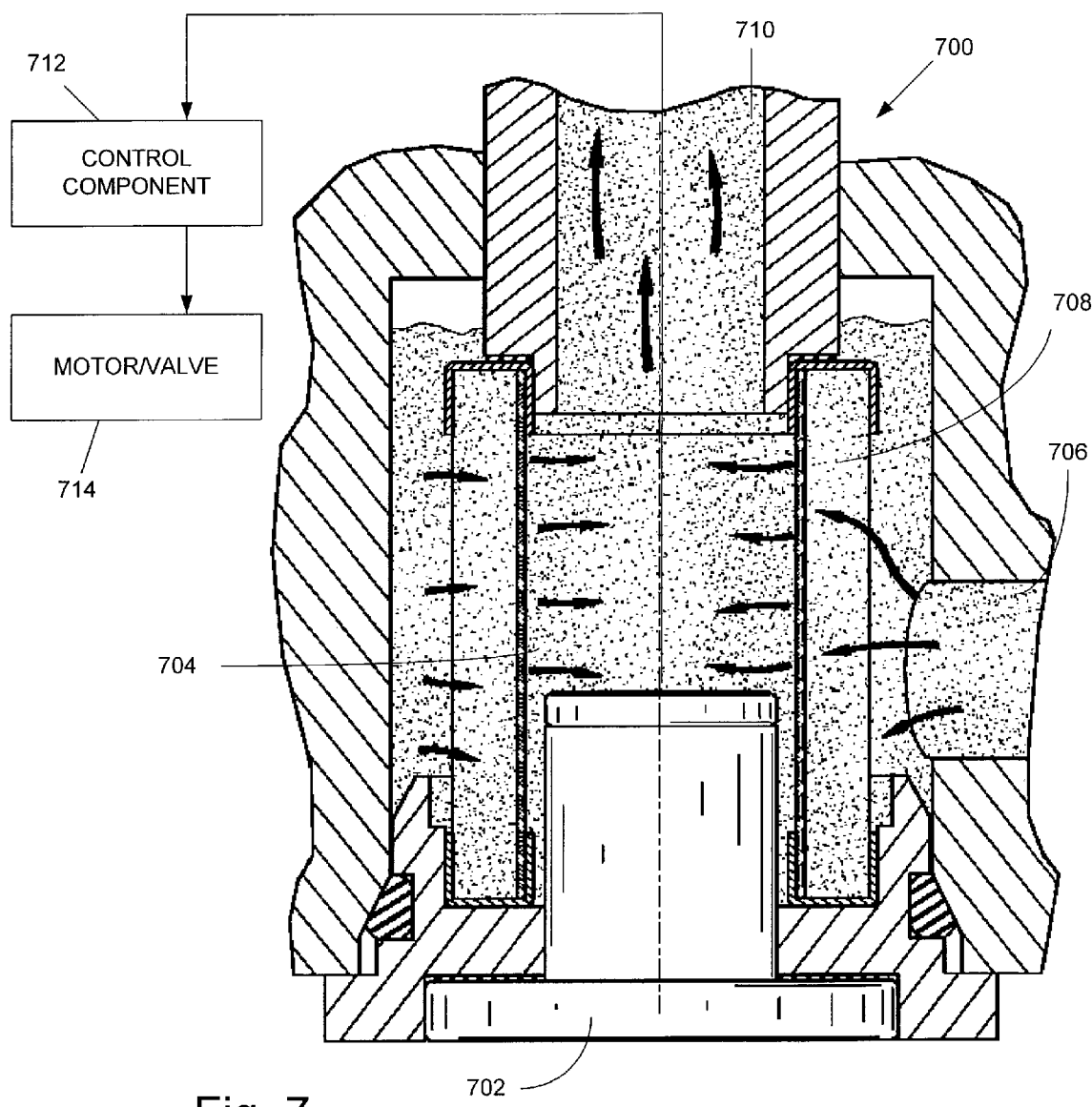
FIG. 7 is a diagram of a control component used in conjunction with one aspect of the present invention

Referring now to FIG. 7, a system 700 for controlling a motor and/or the amount of oil or additive added or removed from a motor is displayed. The system 700 includes a lubrication sensing assembly 702 imbedded into an interior chamber of a lubrication filter assembly 704. A lubricating material travels along a pipeline 706 and through filter material 708 into the internal chamber of the lubrication filter assembly 704. The lubricating material passes over a plurality of sensors (not shown) prior to exiting the interior chamber of the filter assembly 704 via a second pipeline 710. The plurality of sensors is utilized to determine various parameters regarding the lubrication material, such as pH, temperature, conductivity, electro-chemical composition, and/or viscosity.

The sensors then relay the data to a control component 712, which comprises at least a control system. The data can be relayed, e.g., through the use of wire, optics and/or through wireless transmitters/receivers. The control component 712 utilizes at least one of the measured parameters of the lubricating material as an input to a control system, wherein the control system is configured to control the operation of a motor and/or a valve 714. For example, if the sensed temperature of the lubricating material is too high, the control component 712 can require the motor to operate at a slower pace (e.g., at a pace which the temperature would drop). In another example, a valve can be opened to flush and/or add lubricating material from/to the system 700 if the viscosity of the lubricating material is deemed too low. Such as may occur for example from fuel dilution of a lubricant. Furthermore, more than one parameter sensed by the plurality of sensors can be employed in the control component 712 to control the operation of the motor and/or valve, and parameters not relating to the lubricating material may also be utilized in the control system (i.e., sensed torque on a rotating shaft).

Figure 8:
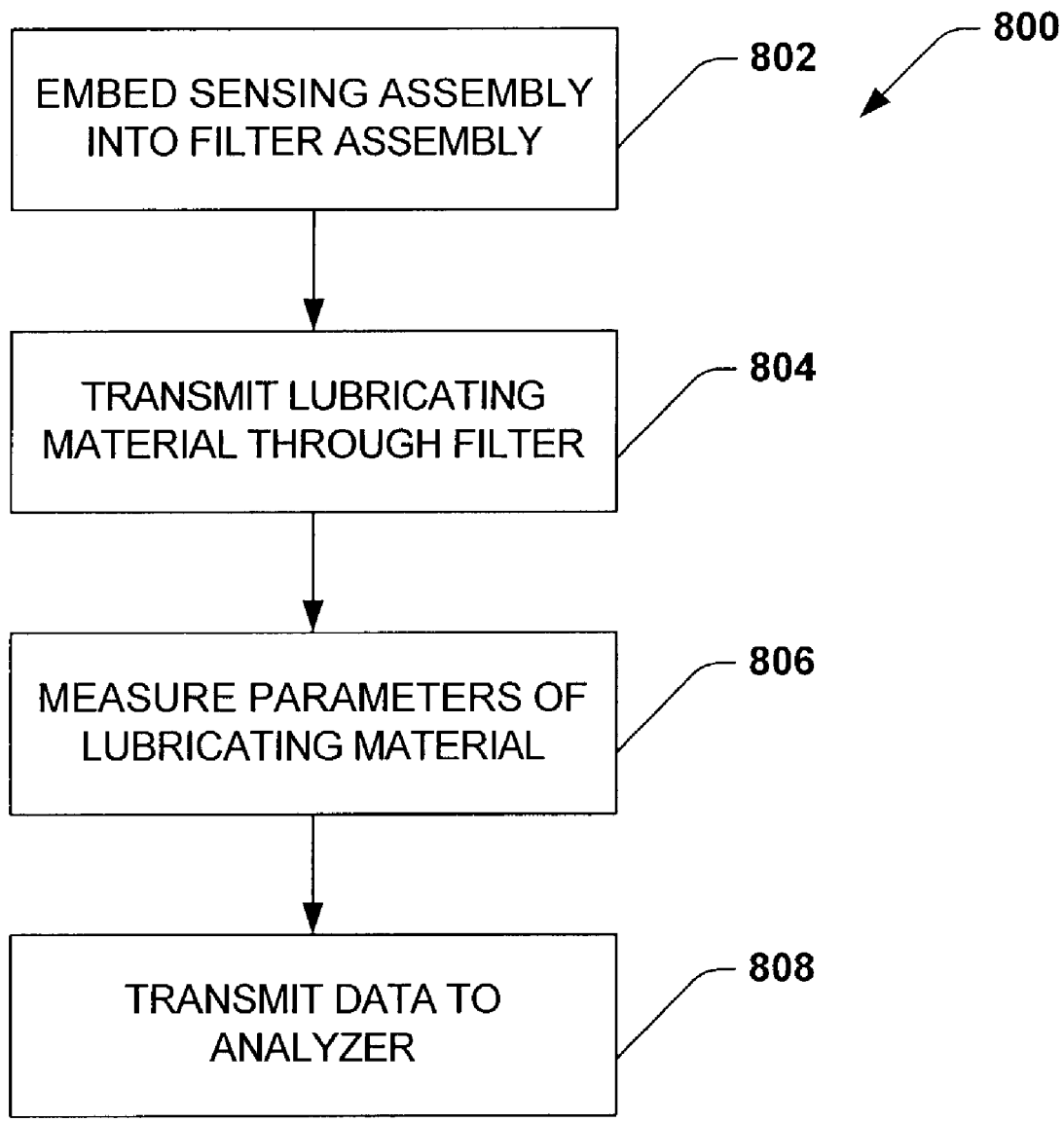
FIG. 8 is a flow diagram of a method that facilitates the sensing of various parameters of a lubricating material in accordance with an aspect of the present invention.

Referring now to FIG. 8, a method 800 for sensing at least one parameter in a lubrication filter assembly is displayed. While, for purposes of simplicity of explanation, the methodologies of the subject invention are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention. The invention may be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

At 802, a lubrication sensing assembly is embedded into a lubrication filter assembly. Typically, a lubrication filter assembly will comprise a base and a filter material, and will be in the shape of a hollow cylinder. However, any suitable male and female engagement configuration is contemplated and intended to fall within the scope of the hereto appended claims. Likewise, it is contemplated that the filter and sensing assembly can be a single integrated filtering/sensing component as compared to a modular sensing assembly installing into a filter housing. The interior chamber created by the hollow filter assembly creates an efficient area to embed a lubrication sensing assembly. The lubrication sensing assembly can be machined in such a manner to allow a mechanical mounting to the base of the lubrication filter assembly. The lubrication sensing assembly should extend deeply enough into the interior chamber of the lubrication filter assembly to allow lubricating material to naturally pass over a plurality of sensing devices contained on the lubrication sensing assembly.

At 804, lubricating material is transmitted through a filter material of the lubrication filter assembly. The lubricating material can be forcibly transmitted through the filter material using a pump, for example, or can naturally pass through the filter material via gravity. The filter material is designed to filter out larger contaminants contained within the lubricating material. Then at 806 parameters of the lubricating material are measured as the lubricating material passes over a plurality of sensors which are mounted to the lubrication sensing assembly. In one embodiment, the sensors are utilized to determine pH, temperature, conductivity, electro-chemical composition, and/or viscosity of the lubricating material.

At 808 the plurality of sensors transmits the data to an analyzer. The analyzer contains a processor for processing and analyzing the data received from the plurality of sensors in real-time. The analyzer also can perform sensor fusion and model-based fluid/system diagnostics and prognostics. The analyzer can also contain a control system for controlling the operation of a motor and/or a valve based on one or more of the sensed parameters of the lubricating oil. The analyzer can further contain a display component, a storage component, and an input/output component to increase the usability of the analyzer. The data can be sent from the plurality of sensors to the analyzer via wireless transmitter/receiver or through any other means of relaying data from one computing component to another.

Figure 9:
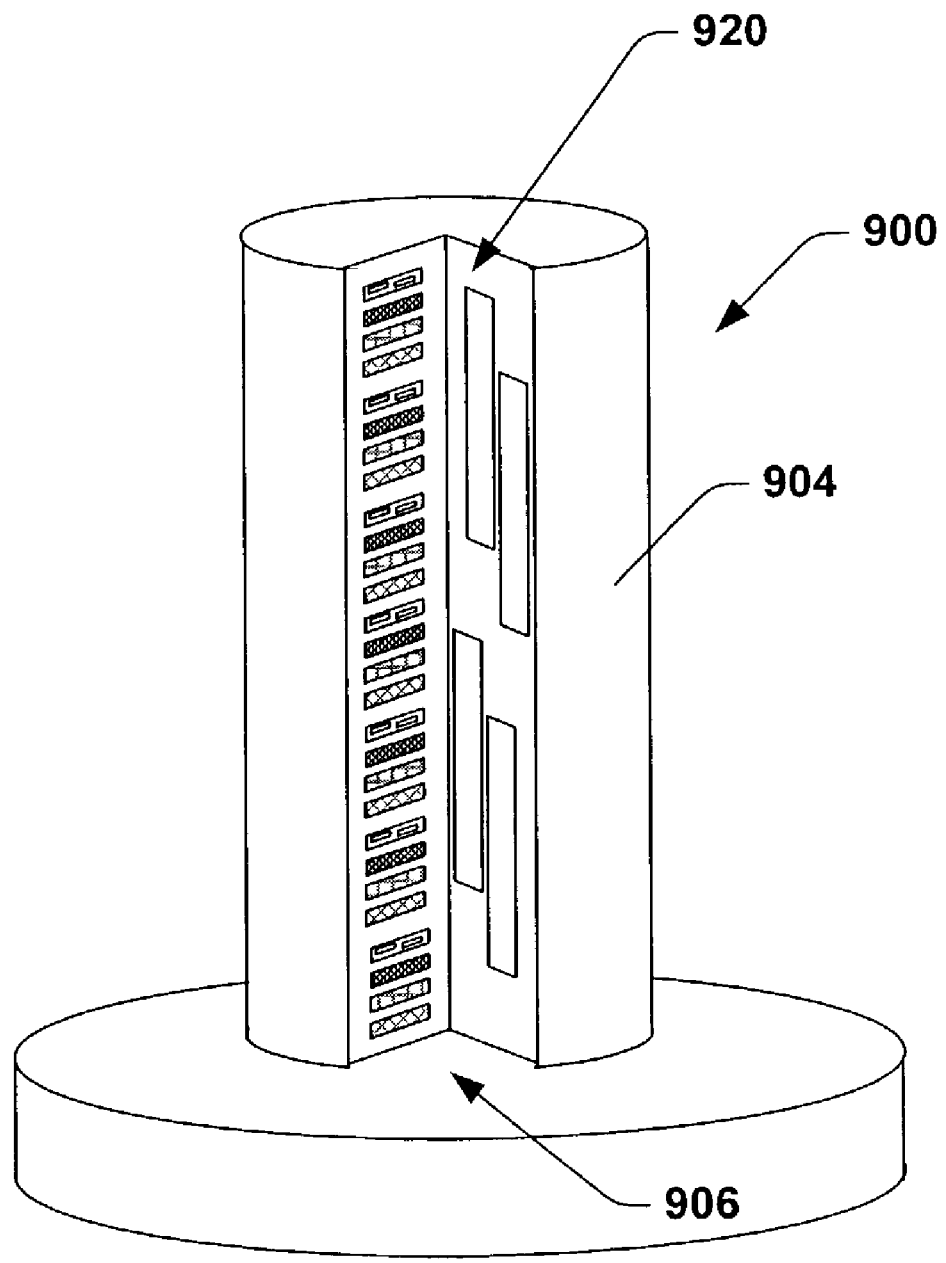
FIG. 9 illustrates an alternative embodiment of a sensing assembly 900 in accordance with the subject invention.

FIG. 9 illustrates an alternative embodiment of a sensing assembly 900 in accordance with the subject invention. The sensing assembly includes an extension 904 with a v-groove 906 formed along a vertical direction thereof. Disposed across a surface portion of the v-groove are a plurality of sensing elements 920 in accordance with the subject invention. Rather than the sensing elements being disposed only a top end surface of the extension 904, the sensing elements are located along a surface region of the v-groove. An advantage of such embodiment is that the sensing elements 920 can be exposed to fluid entering the filter at substantially all levels as compared to a single horizontal plane of the fluid. Moreover, such embodiment also provides relatively increased sensor surface area for contact with the fluid so as to facilitate gathering data relating to the fluid.

It is to be appreciated that a variety of embodiments with respect to placement of sensing elements (e.g., about a circumferential surface, in a v-groove along a substantially slat, vertical plate, along ridges of an extension, top surface, a combination of the aforementioned . . . ), and such embodiments are intended to fall within the scope of the hereto appended claims.

Figure 10:
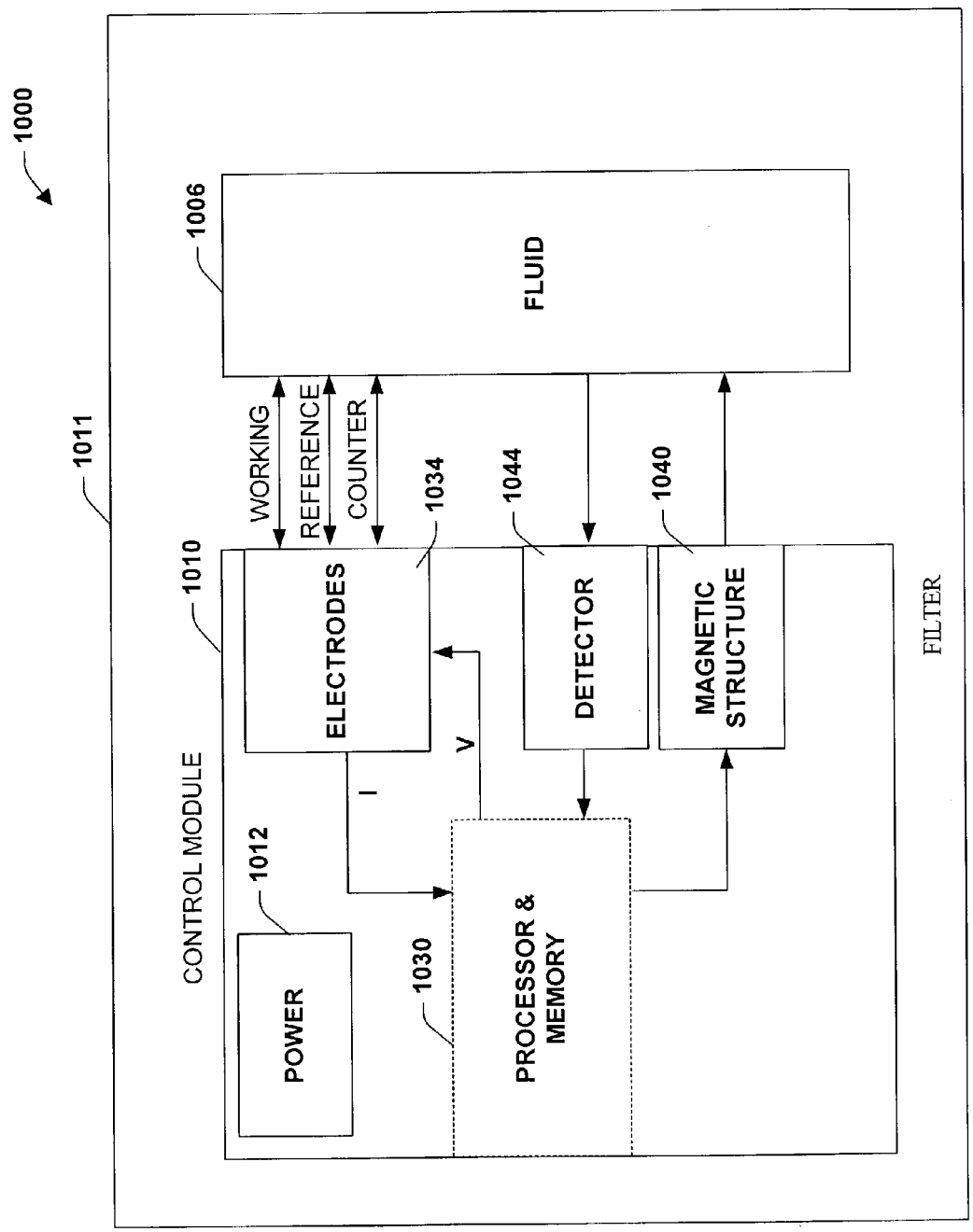
FIG. 10 illustrates a closed-loop system 1000 to adjust fluid characteristics according to an aspect of the present invention.

FIG. 10 illustrates a closed-loop system 1000 to adjust fluid characteristics according to an aspect of the present invention. In this aspect of the present invention, fluid lifetime can be extended via one or more excitation stimuli operative with a fluid 1006, such as an equipment lubricant, in order to alter properties of the fluid. The stimuli can be provided via an integrated sensor-control module 1010 that integrates with a filter 1011. The sensor-control module 1010 includes a power source 1012, wherein a processing and memory unit 1030 is operative to provide control aspects to the module 1010 as described below.

Oxidation present in greases and oils can be determined by employing cyclic volta-metric techniques. A multi-electrode component 1034 is illustrated including a working electrode, reference electrode, and a counter electrode. It is noted that other combinations or numbers of electrodes can be employed to perform the measurements. For example, a two-electrode system can be utilized to perform cyclic voltametric techniques. By applying a voltage (V) across the working and reference electrode, a current (I) can be induced in the counter electrode in order to determine such parameters as oxidation in the fluid 1006.

The voltage can be cyclically ramped up and down from $-5V$ to $+5V$ to $-5V$ to $+5V$ to $-5V$, for example, and the current recorded during the voltage excursions. Characteristic peaks observed and analyzed in an I-V curve can be driven by an oxidation and reduction that occurs in the fluid 1006 in substantially close proximity to the component electrodes 1034. The oxidation reaction is typically not the addition of oxygen to compounds in the fluid 1006 but rather the loss of electrons in the compounds. Similarly, a reduction phase of the operation results in a gain of electrons for fluid compounds.

In addition to sensing when the oxidation and reduction has occurred in the fluid 1006, the control module 1010 can provide an excitation signal via the electrodes 1034 to mitigate degenerative aspects of the fluid 1006 such as from oxidation—thus, providing loop closure to sense the health and then facilitate restoration of the fluid 1006. The excitation signal can be generated for a longer time period and higher voltage (longer/higher—relative to oxidation detection cycles described above) for a reduction phase and followed with a brief, low voltage excitation for a complete reduction cycle. Additional voltage and time spent in the reduction phase is employed to reduce the oxidation present in the fluid compounds such as antioxidants, or to slow the rate of fluid oxidation or to reduce the rate of ant-oxidant additive depletion.

Other type electrodes 1034 can be fabricated on the control module 1010 to provide a larger surface area and support a higher power output for the reduction reaction. It is to be appreciated that an array of such reducing electrodes 1034 can be constructed and alternatively, selected portions of the array can be activated if degradation or wear of electrodes occur during the reducing cycle.

Another aspect of the present invention includes fabrication of micro-electronic magnetic structures 1040 along with micro-electronic sensors or detectors 1044 on the control module 1010. The magnetic structures 1040 facilitate attracting ferrous metallic particles from the fluid 1006, wherein presence of a magnetic field will prevent these particles from flowing freely in the fluid and migrating into rolling elements and associated equipment contact surfaces. A larger structure 1040, perhaps outside the path of rolling elements, can serve to mitigate having such metal particles contaminate a raceway, for example. Such attracted materials can also be bound to a sensor electrode via a plating-type operation. The amount of ferrous materials attracted can be measured with any of a number of detectors 1044 which include conductivity between several sensor electrodes, plating energy, or capacitive or dielectric strength between several surfaces. It is to be appreciated that oxidation and particle removal aspects of the present invention do not have to be combined into a singular control module but can also be provided as part of separate control module or function.

Figure 11:
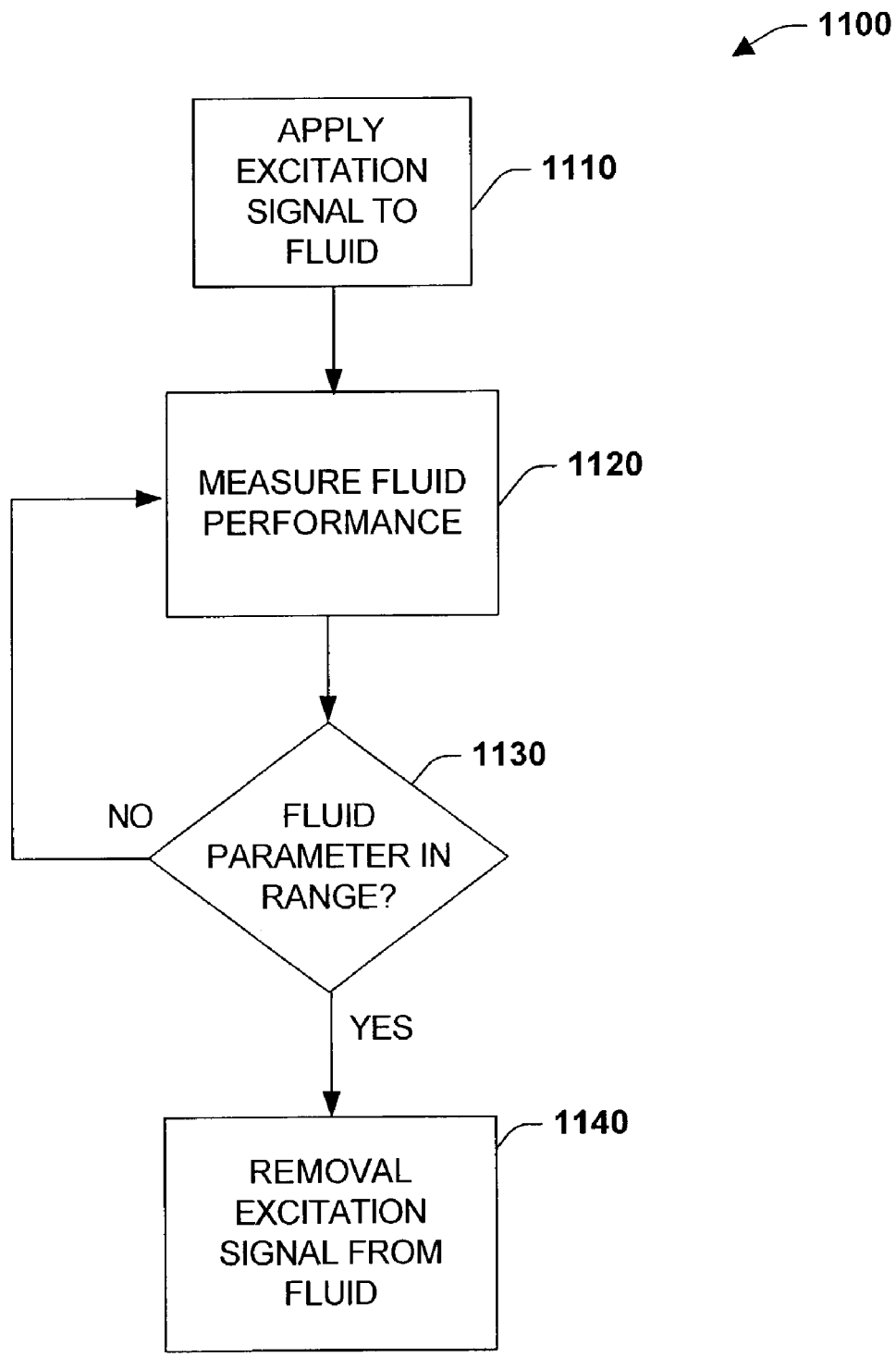
FIG. 11 is a flow diagram of a lubrication control process 1100 according to an aspect of the present invention.

FIG. 11 is a flow diagram of a lubrication control process 1100 according to an aspect of the present invention. This process can be executed by the control modules described above and/or can be implemented according to a control state machine and/or algorithm, for example. Proceeding to 1110, an excitation signal is applied to a fluid in order to change or alter the characteristics or performance of the fluid. For example, a voltage can be applied in the form of an extended pulse and/or increased voltage magnitude in order to replenish electrons that have been depleted from the fluid. In another aspect, a magnetic field can be applied as the excitation signal in order to remove contaminants such as ferrous material from the fluid. It is noted that the excitation pulse can also be directed to an actuator or controllable valve, wherein additives are provided to the existing fluid as described above. At 1120, fluid parameters are measured in order to determine the effectiveness of the excitation signal applied at 1110. For example, current can be measured when applying voltage pulses to determine an amount of oxidation present in the field. In the case of ferrous particles, conductivity can be measured between electrodes, measured via plating energy, and/or measured between capacitive surfaces, for example.

At 1130, a determination is made whether the fluid measurements of 1120 are in range. This can include setting predetermined parameter thresholds and making the determination regarding the fluid based upon the measured parameter being above or below the predetermined threshold. If the measured fluid parameter is in range at 1130, the process proceeds to 1140 and removes the excitation signal from the fluid or in the case of additives, a valve can be disengaged. If the measured parameter is out of range at 1140, the process proceeds back to 1120 and performs another fluid measurement. It is noted, that the loop depicted between 1120 and 1130 can be executed as a background routine, wherein a processor periodically returns, performs the measurement at 1120 and makes the determination at 1130. In addition, a counter can be set whereby if the measurements taken at 1120 are not within range after a predetermined number of readings as indicated by the counter, a control signal can be activated and/or alarm triggered that the fluid is not responding to the excitation signal applied at 1110. Furthermore, by measuring the control input provided such as the current, providing and measuring the system response in a prescribed time period, it is possible to determine how much the fluid has degraded. This feedback comparison method can also provide diagnostic information on the sensors and control system.

Figure 12:
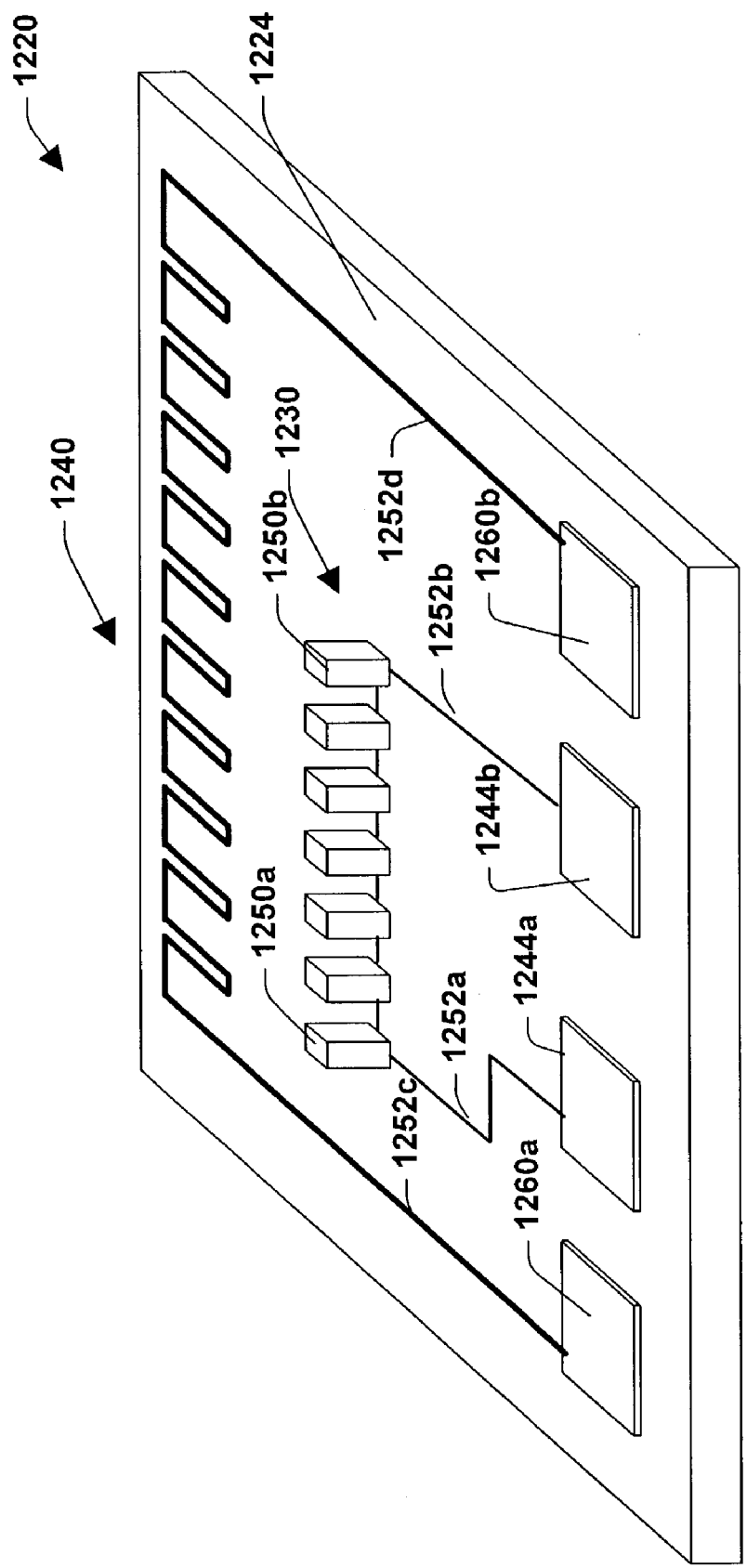
FIG. 12 illustrates an embodiment of an exemplary viscosity sensor 1220 that can be integrated with a filter in accordance with the present invention.

FIG. 12 illustrates an embodiment of an exemplary viscosity sensor 1220 that can be integrated with a filter in accordance with the present invention. The viscosity sensor 1220 includes a semiconductor base 1224 which preferably comprises silicon, however, any suitable material can be employed. Protruding perpendicularly from the base 1224 is an array of finger-like elements 1230 which can be the same material as the base 1224. As will be discussed in greater detail below, the base 1224 and the array of finger-like elements 1230 are formed by etching a semiconductor substrate material. The array of finger-like elements 1230 are designed to extend into and be coated by the lubricant that is being measured. The finger-like elements 1230 will be damped by the lubricant as a function of the viscosity of the lubricant. Accordingly, such damping effect will influence the amount of power required to oscillate the finger-like elements 1230 at a desired frequency.

The lubricant creates a dissipative or damping force that resists the motion of the energized finger-like elements. Thus, the higher the viscosity of the lubricant the more power that is required to oscillate the finger-like elements at a particular frequency. As will be discussed in greater detail below, by monitoring the power required to oscillate the finger-like elements at a particular frequency and employing other interpretive parameters (e.g., temperature) the viscosity and/or health state of the lubricant can be determined.

The viscosity sensor 1220 includes a temperature detector 1240 located on the surface of the base 1224. The temperature detector 1240 is preferably formed from platinum, however, it is to be appreciated that any material (e.g., gold) suitable for carrying out the present invention may be employed. The temperature detector 1240 is patterned on the base in accordance with a predetermined length, width and surface area. Therefore, by knowing the surface area of the temperature detector and the material of which it is made, a temperature of a lubricant to which the temperature sensor 1240 is exposed may be determined based on the electrical conductivity of the temperature detector 1240. Knowledge of the lubricant temperature is useful in interpreting the viscosity of the lubricant being analyzed because lubricant viscosity is a function of lubricant temperature. In general, the higher the lubricant temperature, the lower the lubricant viscosity is. However, some lubrication problems (e.g., water contamination) may result in a different lubricant viscosity at the measured temperature than the viscosity expected in fresh, healthy lubrication. The present invention correlates lubricant temperature with the power required to oscillate the array of finger-like elements 1230 at a desired frequency and displacement to establish the health of the lubrication.

A set of electrical contacts 1244a and 1244b are patterned on the base 24 and are bonded to a conductive plating coating and connecting the array of finger-like elements 1230 via conductive pathways 1252. In particular, the array of finger-like elements 1230 are plated (e.g., electroplated) with an inert conductive material such as nickel or the like. The plating serves to electrically couple each of the finger-like elements to one another. The electrical contacts 1244a and 1244b provide for electrical connection to the array of finger-like elements 1230 for oscillating the finger-like elements at a desired frequency. Electrical contact 1244a is coupled to a finger-like element 1250a at one end of the array 1230 via a conductor 1252a. Electrical contact 1244b is coupled to a finger-like element 1250b at the other end of the array 1230 via a conductor 1252b.

Another set of electrical contacts 1260a and 1260b patterned on the base are coupled via the conductive pathways 1252c and 1252d to the temperature detector 1240.

The viscosity sensor 1220 is small having a square area of approximately 4 mm. Accordingly, the viscosity sensor 1220 is desirable for use in applications where space is at a premium but where accuracy, reliability, and sensitivity of measured data are also at a premium. Furthermore, because the viscosity sensor 1220 is fabricated in accordance with integrated circuit-like fabrication techniques, large batches of the sensors 1220 can be easily and efficiently produced with good production yields.

It is to be appreciated that a mirror set of temperature detector, array of finger-like elements and electrical contacts can be formed on the other side of the base 1224 so as to increase functionality of the viscosity sensor 1220.

However, as mentioned above, it is to be appreciated that lubricant diagnosis, trend analysis, forecasting, etc. could be performed by a fluid analyzer in accordance with the subject invention. For example, turning now to FIG. 13 a table 1300 is shown which a processor can access when performing analyses to diagnose state of a lubricant. The table 1300 includes input signal amplitude data ($A_0$ thru $A_z$) corresponding to power requirements to maintain oscillation of the array of finger-like elements 1230 over a range of frequencies ($f_0$ thru $f_N$) and temperatures ($TEMP_1$ thru $TEMP_N$), and good fluid viscosity values ($V_0$ thru $V_z$) corresponding to the amplitude data. Although not shown for ease of understanding, it is to be appreciated that the table may also include correlation to other lubricant parameters. The table 1300 can be stored in a memory of the lubricant analyzer so as to be easily accessible by a processor. The table 1300 includes various good health states of the lubricant which correspond to input signal amplitudes over the frequency range $f_0$ thru $f_N$ and temperatures ($TEMP_1$ thru $TEMP_N$). As will be appreciated, the table 1300 can store an enormous amount of the input signal signatures corresponding to various health states of the lubricant, which the processor can employ to diagnose the state of the lubricant. FIG. 13 data can also be represented as an analytical equation or system model or an artificial neural network for example.

FIG. 14 is a representative table diagram 1400 of fluid viscosity health states based upon actual power requirements to maintain oscillation of the array of finger-like elements 1230 at a particular frequency and displacement at particular temperatures. The table 1400 lists actual fluid viscosity related data in connection with one specific frequency (e.g., $f_1$). It is to be appreciated that many similar tables exist for each particular frequency of the range of frequencies ($f_0$-$f_n$) (see table 1300). Although the table 1400 only shows ranges of good fluid viscosity and bad fluid viscosity for ease of understanding, it is to be appreciated that specific numeric viscosity values for every particular combination of power requirement and temperature may be stored in the table 1400—the table can store for example such info. in an equation, neural network, expert system, fuzzy logic . . . .

The present invention affords for monitoring health of a lubricant in a precise, reliable, inexpensive, convenient and substantially continuous manner. A lubricant analysis system in accordance with the invention provides for frequently monitoring the health state of the lubricant, and can provide for scheduled maintenance of the lubricant in order to facilitate maximizing the life and efficiency of a machine, device or system employing the lubricant and minimizing maintenance cost.

It is to be appreciated that the present invention has numerous applications (e.g., forced lubrication systems; gear boxes; hydrodynamic bearings and other bearing systems, oils, fuels, refrigerants, grease, hydraulic fluids, cutting oils and other types of fluids where knowledge of the viscosity thereof is desired). Each are susceptible to problems and exhibit symptoms with viscosity and temperature as described here (e.g., contamination, breakdown). All such applications are intended to fall within the scope of the present invention as defined in the claims.

Figure 15:
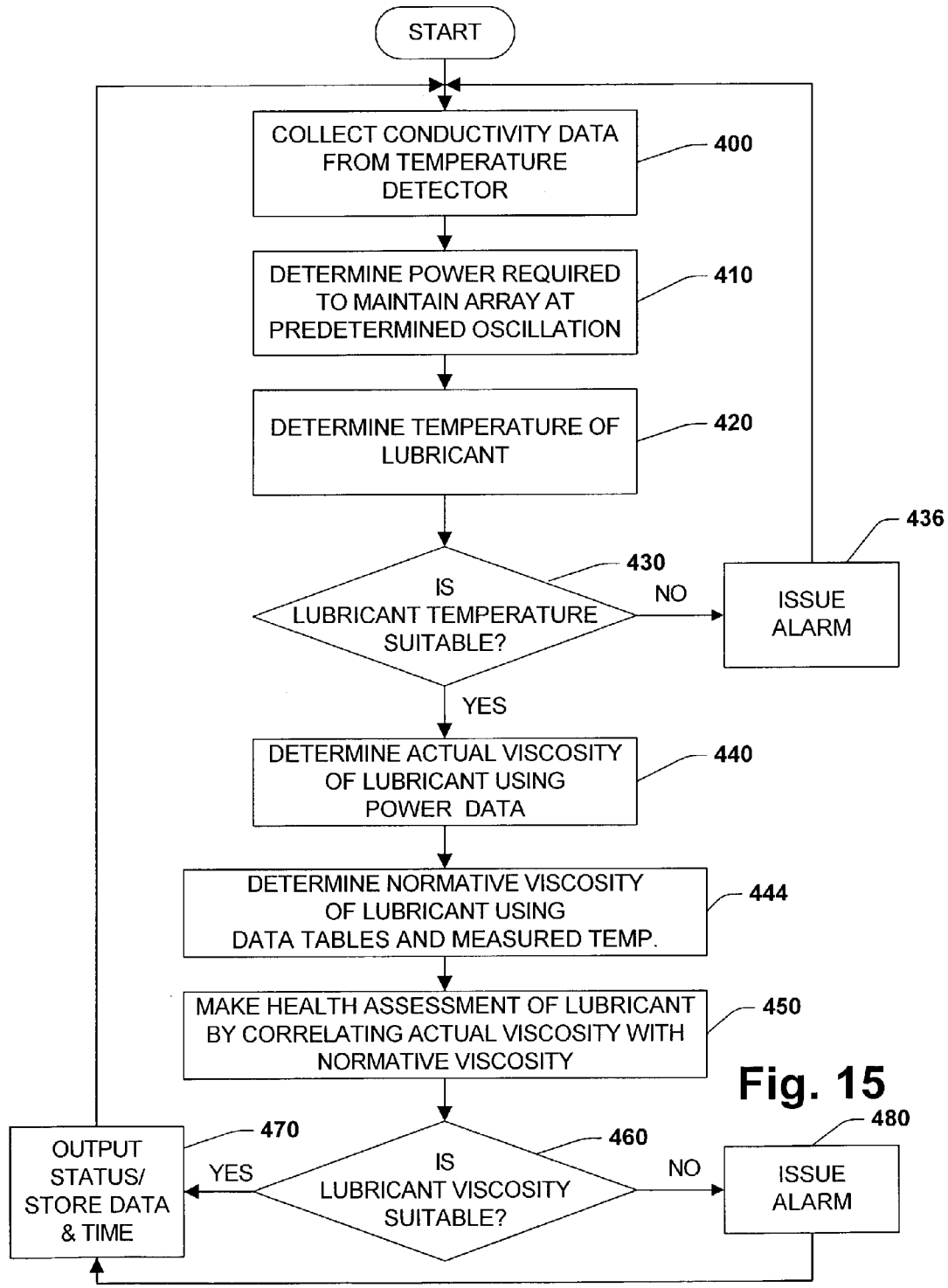
FIG. 15 is a flow diagram illustrating one exemplary methodology for carrying out the present invention.

FIG. 15 is a flow diagram illustrating one exemplary methodology for carrying out the present invention. At 1500, conductivity data is collected from a temperature detector. At 1510, the power required to oscillate the array 1230 is determined. At 1520, a fluid analyzer determines the temperature of the fluid based on conductivity of the temperature detector. At 1530, the fluid analyzer determines if the fluid temperature is suitable. If no, the fluid analyzer 90 issues a warning at 1536. If yes, at 1540 the fluid analyzer determines actual viscosity of the fluid using power data. At 1544, the fluid analyzer determines a normative viscosity level for the fluid using data tables and measured temperatures. The normative viscosity level is a preferred/desired viscosity level corresponding to the type of fluid with an acceptable margin (e.g., +/−10%), the specific application of the fluid and measured temperature. At 1550, the fluid analyzer (employing an adaptive processor) makes a health assessment of the fluid by correlating actual viscosity (act 1540) with normative viscosity (act 1544). At 1560, the fluid analyzer determines whether or not the viscosity level is suitable. If yes, the process proceeds to 1570 where the status of the fluid is output, the fluid data is stored and date stamped. If no, the process proceeds to 1580 where an alarm is issued. Thereafter, the process proceeds to 1570. The process then returns to 1500 to be repeated.

Although, the present invention has been described with respect to sensing and analysis primarily of a lubricant, it is to be appreciated that the present invention provides for in situ monitoring of any suitable fluid where knowledge of properties and/or states thereof is desired.

Moreover, other aspects of the invention include for example, sensor elements located inside as well as outside of a filter (e.g., before filtration and after filtration). For example, the sensor elements can be on small stalks on the outside of the filter paper or fabricated right on the filter paper. The invention can also employs a pressure sensor and/or an accelerometer in connection with the fluid sensor. The pressure sensor can be on both the inside and outside of the filter element. Knowing differential pressure is extremely valuable to determine amount of debris collected, to determine if the filter has failed, and to determine when to replace the filter—in combination with the fluid chemistry, this is very valuable.

Another aspect of the invention provides for an integrated battery wherein for example, the battery and/or sensor elements can be printed on filter paper.

Another aspect of the invention provides for diagnosing fluid, diagnosing a machine, and diagnosing an integrated fluid-machinery system (taking into account interaction of the fluid with machinery operation). Similarly, future state (prognostics) can be determined for each of these. The analysis performed can include model-based methods—models of fluid operation and models of fluid wear and degradation.

In accordance with another aspect of the invention, a sensor-filter can include a radio (or other communication device/system) integrated and/or attached thereto.

As noted supra, the invention contemplates a self-powered filter-sensor employing power scavenging methods. Techniques for scavenging power from an environment in a filter can include for example: (1) use of a "paddle-wheel" rotating in a magnetic field turning due to fluid flow, (2) use of a piezo-electric vibrating strip or diaphram, (3) employment of an electro-chemical reaction with the fluid being monitored.

In accordance with another embodiment, components of the system (e.g., processor, display, . . . ) can be embedded in a filter cannister and not just in the filter.

Another aspect of the invention provides for sensing ferrous material on an inside (after filtration) and outside (before filtration) of a filter element—this is a very good diagnostic.

With respect to viscosity operation, the invention can include sensing displacement of moveable fingers (e.g., typically capacitance sensing is used) so as to know how much the fingers are moving after applying a defined voltage level. For the viscosity sensor, in addition to operating at a specific frequency, the invention can include an option of sweeping a range of frequencies—the frequency providing the greatest displacement is very valuable sensing and diagnostic information.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A filter-sensor integration, comprising;
 a filter assembly having a housing defining an interior chamber, the filter assembly comprising a filter material forming a filter enclosing the chamber; and
 a sensing assembly comprising a base, an extension perpendicular from the base, the extension comprising a v-groove formed along a vertical direction thereof and at least one sensor located on a surface portion of the v-groove in the extension of the sensing assembly, wherein the portion of the extension is positioned within the interior chamber of the filter such that it is enclosed by the filter and integrally fits within the interior chamber.

2. The filter-sensor integration of claim 1, wherein lubricating material enters the chamber through the filter material.

3. The filter-sensor integration of claim 2, the lubrication sensing assembly being embedded within the chamber of the lubrication filter assembly.

4. The filter-sensor integration of claim 3, the sensing assembly being positioned relative to the filter material so that the at least one sensor senses in situ different parameters of a fluid.

5. The filter-sensor integration of claim 1, further comprising a processor that receives fluid-related data from the at least one sensor, and processes the data in connection with diagnosing a state of the fluid.

6. The filter-sensor integration of claim 5, the processor diagnosing a state of a machine or device employing the fluid.

7. The filter-sensor integration of claim 5, the processor performs a data fusion analysis relating to data gathered from a plurality of sensors.

8. The filter-sensor integration of claim 5, the processor relays the processed data to a host computer, the host computer performing an analysis relating to state of the fluid.

9. The filter-sensor integration of claim 5 further comprising wireless communication means for receiving and/or transmitting data.

10. The filter-sensor integration of claim 5, the processor is mounted to the sensing assembly.

11. The filter-sensor integration of claim 10 further comprising a separate housing that facilitates protection of the processor.

12. The filter-sensor integration of claim 5, the processor employs a trained classifier in connection with fluid analysis.

13. The filter-sensor integration of claim 12, the classifier is implicitly trained.

14. The filter-sensor integration of claim 12, the classifier comprises at least one of: a neural network, an expert system, a Bayesian network, a support vector machine, and a data fusion engine.

15. The filter-sensor integration of claim 1, further comprising a processor that receives fluid-related data from the at least one sensor, and processes the data in connection with prognosing a state of the fluid.

16. The filter-sensor integration of claim 15, the processor prognosing a state of a machine or device employing the fluid.

17. The filter-sensor integration of claim 1, wherein the at least one sensor(s) senses at least one of the following: pH, chemical composition, temperature, conductivity, viscosity, and pressure.

18. A fluid analysis system, comprising;
a filter having a housing, the filter comprising filter material that provides for fluid to pass there through, the filter housing defining an interior chamber enclosed by the filter material;
a sensing assembly comprising an extension that comprises a v-groove formed along a vertical direction of the extension, a sensing array located on a surface portion of the v-groove, and having a plurality of sensors that sense various modalities of the fluid, the sensing assembly modularly integrating with the filter such that the extension is positioned such that it resides within the interior chamber, is enclosed by the filter and at least a subset of the sensors are exposed to the fluid; and
a processing system that receives data from the sensors and performs an analysis of the fluid based at least in part on the data.

19. The fluid analysis system of claim 18, the filter and sensing assembly coupling respectively together via a female/male configuration.

20. The fluid analysis system of claim 18, the sensing array residing on a top surface of the extension.

21. The fluid analysis system of claim 18, the sensing array residing on a circumferential surface of the extension.

22. The fluid analysis system of claim 18, the processing system comprising a memory.

23. The fluid analysis system of claim 18, the processing system comprising a trained classifier.

24. The fluid analysis system of claim 18, the plurality of sensors comprising at least two of: a pH sensor, a viscosity sensor, a temperature sensor, a pressure sensor, a glucose sensor, a current sensor, a voltage sensor, and a vapor sensor.

25. The fluid analysis system of claim 18, analyzing a lubricant.

26. The fluid analysis system of claim 18, analyzing a gas.

27. The fluid analysis system of claim 18, analyzing blood.

28. The fluid analysis system of claim 18, analyzing a beverage.

29. The fluid analysis system of claim 18, the processing system being integrally formed on the sensing assembly.

30. The fluid analysis system of claim 29, further comprising a power supply that is integral to the sensing assembly.

31. The fluid analysis system of claim 30, the power supply employs energy scavenging schemes.

\* \* \* \* \*